US012804067B2

(12) United States Patent
Kim et al.

(10) Patent No.: US 12,804,067 B2
(45) Date of Patent: Nov. 17, 2026

(54) ELECTRONIC DEVICE INCLUDING FLAT CABLE COUPLED TO ELASTIC BRACKET

(71) Applicant: SAMSUNG ELECTRONICS CO., LTD., Suwon-si (KR)

(72) Inventors: Yunsup Kim, Suwon-si (KR); Sanghoon An, Suwon-si (KR); Seunghoon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 18/888,774

(22) Filed: Sep. 18, 2024

(65) Prior Publication Data

US 2025/0039290 A1 Jan. 30, 2025

Related U.S. Application Data

(63) Continuation of application No. PCT/KR2024/010847, filed on Jul. 25, 2024.

(30) Foreign Application Priority Data

Jul. 25, 2023 (KR) ........................ 10-2023-0096866
Aug. 25, 2023 (KR) ........................ 10-2023-0112208

(51) Int. Cl.
*H04M 1/00* (2006.01)
*H01B 7/04* (2006.01)
(Continued)

(52) U.S. Cl.
CPC ............ *H04M 1/0277* (2013.01); *H01B 7/04* (2013.01); *H01B 7/08* (2013.01)

(58) Field of Classification Search
CPC ......... H04M 1/0277; H01B 7/04; H01B 7/08; G06F 1/16
See application file for complete search history.

(56) References Cited

U.S. PATENT DOCUMENTS 6,194,664 B1 * 2/2001 Zamora .................. H02G 11/00 248/51
6,256,481 B1 * 7/2001 Jeong .................. H04M 1/0216 455/575.3

(Continued)

FOREIGN PATENT DOCUMENTS

CN 1691187 A 11/2005
CN 214481436 U 10/2021

(Continued)

OTHER PUBLICATIONS

International Search Report (PCT/ISA/210) and Written Opinion (PCT/ISA/237) issued Oct. 24, 2024 by the International Searching Authority in International Patent Application No. PCT/KR2024/010847.

*Primary Examiner* — Rockshana D Chowdhury
(74) *Attorney, Agent, or Firm* — Sughrue Mion, PLLC

(57) ABSTRACT

An electronic device includes: a printed circuit board; and a flat cable having an end electrically connected to the printed circuit board, wherein the flat cable includes: a cable connector at the end of the flat cable and coupled to the printed circuit board; a curved part having a curved shape; and an elastic bracket comprising an elastic material, the elastic bracket coupled to at least one end of opposite ends of the curved part and configured to apply an elastic contraction force in a direction in which the opposite ends of the curved part become closer to each other.

18 Claims, 20 Drawing Sheets

(51) Int. Cl.
*H01B 7/08* (2006.01)
*H04M 1/02* (2006.01)

(56) References Cited

U.S. PATENT DOCUMENTS

| | | | | |
|---|---|---|---|---|
| 6,906,262 | B2 * | 6/2005 | Fujimura | H01R 4/01 174/72 A |
| 7,115,006 | B2 * | 10/2006 | Onuma | H01R 43/04 439/881 |
| 8,712,233 | B2 * | 4/2014 | Gibbs | H05K 1/028 343/702 |
| 9,658,648 | B2 * | 5/2017 | Rappoport | G06F 1/1656 |
| 9,853,377 | B2 * | 12/2017 | Kim | H01R 12/7076 |
| 10,462,928 | B2 * | 10/2019 | Chen | H01B 7/08 |
| 10,608,359 | B2 * | 3/2020 | Kim | H01R 12/7023 |
| 10,610,157 | B2 | 4/2020 | Pandya et al. | |
| 10,733,946 | B2 | 8/2020 | Kurokawa | |
| 11,029,221 | B2 | 6/2021 | Kobayashi et al. | |
| 11,178,763 | B2 * | 11/2021 | Yang | H04M 1/0262 |
| 11,570,895 | B2 | 1/2023 | Ju et al. | |
| 2004/0248434 | A1 * | 12/2004 | Fujimura | H01R 4/01 439/67 |
| 2008/0167073 | A1 * | 7/2008 | Hobson | H01Q 13/10 455/557 |
| 2011/0247877 | A1 * | 10/2011 | Onodi | H01R 4/2487 174/117 F |
| 2011/0255250 | A1 * | 10/2011 | Dinh | B32B 17/061 174/250 |
| 2011/0255850 | A1 * | 10/2011 | Dinh | B32B 17/061 396/176 |
| 2013/0010406 | A1 * | 1/2013 | Stanley | H01H 13/86 361/679.01 |
| 2013/0223836 | A1 * | 8/2013 | Gibbs | H05K 5/0217 361/679.01 |
| 2013/0257659 | A1 * | 10/2013 | Darnell | H01Q 1/243 343/702 |
| 2014/0078692 | A1 * | 3/2014 | Park | G02F 1/133308 361/749 |
| 2016/0044816 | A1 * | 2/2016 | Jarvis | H01H 23/04 361/767 |
| 2016/0276757 | A1 * | 9/2016 | Smith | H01R 11/01 |
| 2016/0294086 | A1 * | 10/2016 | Kim | H01R 12/7076 |
| 2017/0094818 | A1 * | 3/2017 | Kim | G06F 1/1626 |
| 2017/0303388 | A1 * | 10/2017 | Mathewson | A61B 6/56 |
| 2019/0061650 | A1 * | 2/2019 | Kato | H01B 7/08 |
| 2019/0148857 | A1 * | 5/2019 | Takase | H01R 13/5829 439/495 |
| 2020/0054426 | A1 * | 2/2020 | Prendergast | A46B 11/06 |
| 2020/0294428 | A1 * | 9/2020 | Kim | G06F 1/1637 |
| 2020/0310577 | A1 * | 10/2020 | Jeon | G06F 3/0412 |
| 2020/0396832 | A1 * | 12/2020 | Yamashita et al. | H05K 1/0283 |
| 2021/0084764 | A1 * | 3/2021 | Yang | H04M 1/0262 |
| 2021/0094487 | A1 * | 4/2021 | Yamaguchi | H01B 7/08 |
| 2021/0247806 | A1 | 8/2021 | Lee et al. | |
| 2022/0124913 | A1 * | 4/2022 | Kwak | H01R 35/02 |
| 2023/0029875 | A1 * | 2/2023 | Tan | G06F 1/203 |
| 2023/0223678 | A1 * | 7/2023 | Yoo | H04M 1/02 343/702 |
| 2024/0120670 | A1 * | 4/2024 | Vasbinder | H01R 12/613 |
| 2025/0013267 | A1 * | 1/2025 | Takashima | G06F 1/1681 |
| 2025/0039290 | A1 * | 1/2025 | Kim | H04M 1/0277 |
| 2025/0150523 | A1 * | 5/2025 | Cho | H04M 1/0266 |

FOREIGN PATENT DOCUMENTS

| | | | |
|---|---|---|---|
| CN | 216287634 | U | 4/2022 |
| JP | 2019-160483 | A | 9/2019 |
| JP | 7166681 | B2 | 11/2022 |
| KR | 20-0333362 | Y1 | 11/2003 |
| KR | 10-2019-0039534 | A | 4/2019 |
| KR | 10-2019-0119043 | A | 10/2019 |
| KR | 10-2020-0027010 | A | 3/2020 |
| KR | 10-2021-0101669 | A | 8/2021 |
| KR | 10-2021-0149493 | A | 12/2021 |
| KR | 10-2022-0170532 | A | 12/2022 |
| WO | 2024/039041 | A1 | 2/2024 |

* cited by examiner

ELECTRONIC DEVICE INCLUDING FLAT CABLE COUPLED TO ELASTIC BRACKET

CROSS-REFERENCE TO RELATED APPLICATIONS

This application is a continuation of PCT International Application No. PCT/KR2024/010847, which was filed on Jul. 25, 2024, and claims priority to Korean Patent Application No. 10-2023-0112208, filed on Aug. 25, 2023, and claims priority to Korean Patent Application No. 10-2023-0096866, filed on Jul. 25, 2023, in the Korean Intellectual Property Office, the disclosures of each of which are incorporated by reference herein their entirety.

BACKGROUND

1. Field

The disclosure relates an electronic device, and more specifically, to an electronic device including a cable.

2. Description of Related Art

An electronic device includes a circuit board which provides a circuit wire for electrical connection and an arrangement space of an electrical element, such as an integrated circuit, a passive element, a sensor, and a cable for connection. An electrical element is directly disposed on a surface of a circuit board or electrically connected to a circuit board through a cable.

A cable for transmitting a signal or supplying power, for example, a coaxial cable or a flat cable (e.g., flexible flat cable (FFC) utilized by a flexible printed circuit board (FPCB)), may be disposed in the electronic device. A flat cable is thin and flexible, and is thus, is widely used for electronic devices. A flexible cable may be electrically connected to a circuit board through a connector.

When an impact from the outside is applied to an electronic device, tension may be applied to a cable by shaking of an internal element. Tension applied to a cable may cause a failure by separation or damage of a connector. In order to reduce tension applied to the cable, a cable may be provided with slack. However, a cable having a length longer than the shortest distance between the connectors may be irregularly bent due to buckling, and such irregular bending may negatively affect the appearance of an electronic device or sense of touch thereto.

SUMMARY

One or more embodiments of the disclosure may provide an electronic device which reduces the risk of separation or damage of a connector and reduces irregular buckling of a cable.

According to an aspect of the disclosure, an electronic device includes: a printed circuit board; and a flat cable having an end electrically connected to the printed circuit board, wherein the flat cable includes: a cable connector at the end of the flat cable and coupled to the printed circuit board; a curved part having a curved shape; and an elastic bracket comprising an elastic material, the elastic bracket coupled to at least one end of opposite ends of the curved part and configured to apply an elastic contraction force in a direction in which the opposite ends of the curved part become closer to each other.

According to an aspect of the disclosure, the electronic device further includes: at least two elements having different sizes, wherein the curved part of the flat cable overlaps a step formed by a size difference of the at least two elements.

According to an aspect of the disclosure, the curved part has a U-shape.

According to an aspect of the disclosure, the elastic bracket includes: a flexible part configured to extend or contract along a direction of tension applied to the flat cable; and at least one fixing part fixed to the at least one end of opposite ends of the curved part of the flat cable.

According to an aspect of the disclosure, the at least one fixing part includes an adhesive member at a surface of the at least one fixing part and attached to a surface of the flat cable.

According to an aspect of the disclosure, the flexible part is further configured so that a cross sectional area of the flexible part decreases in comparison with a cross sectional area of the at least one fixing part with respect to a direction of tension applied to the flat cable.

According to an aspect of the disclosure, a surface of the flexible part includes perforated holes formed therein.

According to an aspect of the disclosure, the elastic contraction force is based on to a number of the perforated holes and an arrangement interval between the perforated holes.

According to an aspect of the disclosure, the at least one fixing part includes a lateral extension part extending in a width direction of the flat cable, and wherein the lateral extension part is folded to at least partially surround the flat cable.

According to an aspect of the disclosure, the flat cable further includes a fixing groove formed by reducing a width in an area corresponding to the lateral extension part, and wherein the lateral extension part is in the fixing groove.

According to an aspect of the disclosure, a flat cable of an electronic device including a printed circuit board to which the flat cable is electrically connected, the flat cable includes: a cable connector at one end of the flat cable and coupled to the printed circuit board; a curved part having a curved shape; and an elastic bracket comprising an elastic material, the elastic bracket coupled to at least one end of opposite ends of the curved part and configured to apply an elastic contraction force in a direction in which the opposite ends of the curved part become closer to each other.

According to an aspect of the disclosure, the curved part overlaps a step formed by a size difference of at least two elements of the electronic device.

According to an aspect of the disclosure, the curved part has a U-shape.

According to an aspect of the disclosure, the elastic bracket includes: a flexible part configured to extend or contract along a direction of tension applied to the flat cable; and at least one fixing part fixed to the at least one end of opposite ends of the curved part.

According to an aspect of the disclosure, the at least one fixing part includes an adhesive member at a surface of the at least one fixing part and attached to a surface of the flat cable.

According to an aspect of the disclosure, the flexible part is further configured so that a cross sectional area of the flexible part decreases in comparison with a cross sectional area of the at least one fixing part with respect to a direction of tension applied to the flat cable.

According to an aspect of the disclosure, a surface of the flexible part includes perforated holes formed therein.

According to an aspect of the disclosure, the elastic contraction force is determined according to a number of the perforated holes and an arrangement width of the perforated holes.

According to an aspect of the disclosure, the at least one fixing part further includes a lateral extension part extending in a width direction of the flat cable, and wherein the lateral extension part is configured to at least partially surround the flat cable.

According to an aspect of the disclosure, the flat cable includes a fixing groove formed by reducing a width in an area corresponding to the lateral extension part, and wherein the lateral extension part is in the fixing groove.

According to various embodiments disclosed in this document, a curved part formed in a cable may extend or contract in response to tension applied to the cable from the outside, to reduce the risk of separation or damage of a cable connector, and an elastic bracket may apply tension to a curved part to pull same, so as to reduce deterioration of the appearance of an electronic device or the sense of touch thereto due to irregular buckling which may be caused by a spare length of the cable.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
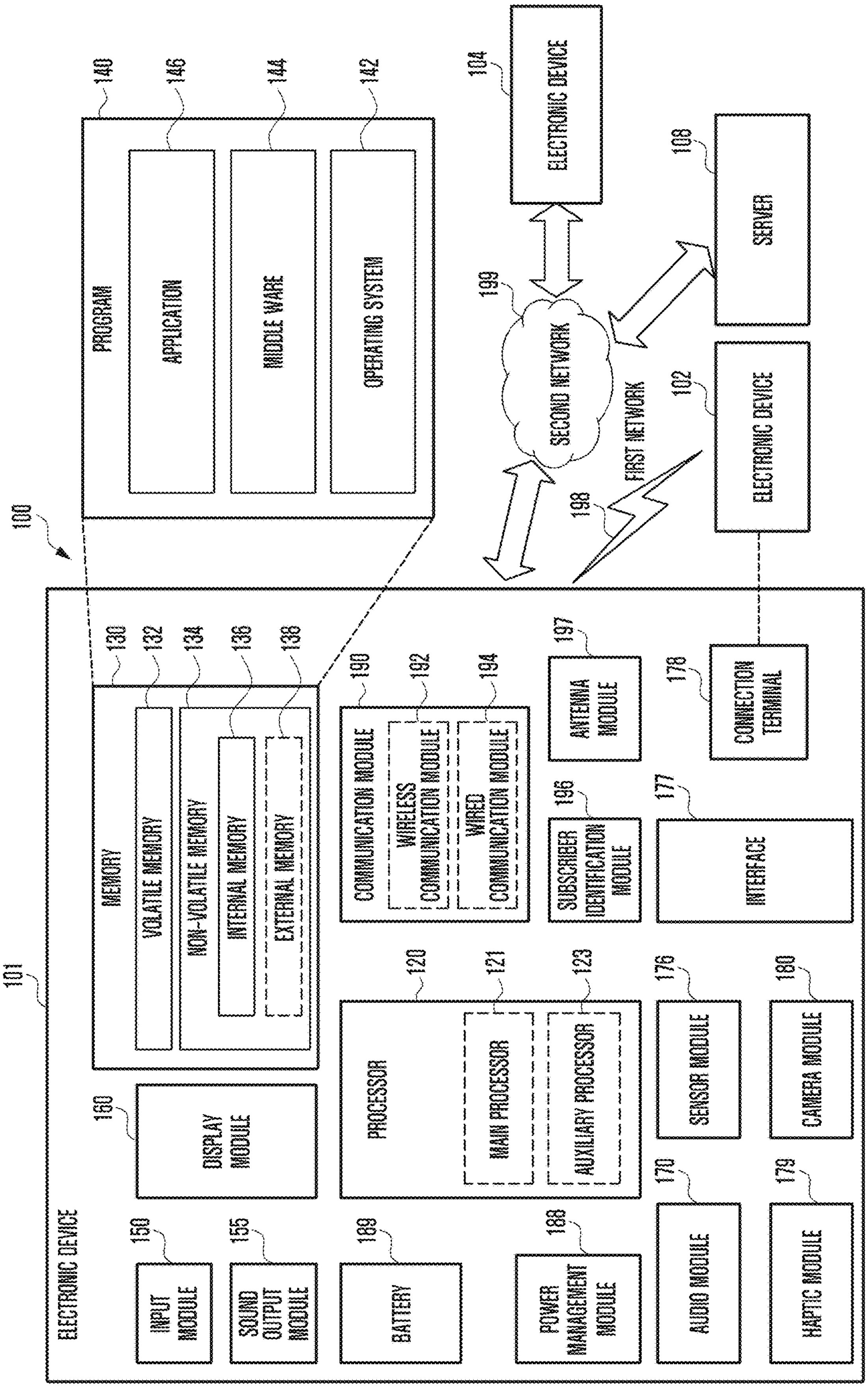
FIG. 1 is a block diagram of an electronic device within a network environment according to various embodiments.

In the following description and the drawings, identical or similar components may be given similar or identical reference numerals.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to one or more embodiments, the electronic device 101 may communicate with the electronic device 104 via the server 108. According to one or more embodiments, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to one or more embodiments, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one or more embodiments, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to one or more embodiments, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to one or more embodiments, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to one or more embodiments, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to one or more embodiments, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to one or more embodiments, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to one or more embodiments, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to one or more embodiments, the haptic module 179 may include, for example, a motor, a piezoelectric element, or an electric stimulator.

The camera module 180 may capture a still image or moving images. According to one or more embodiments, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to one or more embodiments, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to one or more embodiments, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to one or more embodiments, the antenna module 197 may include an antenna including a radiating element composed of a conductive material or a conductive pattern formed in or on a substrate (e.g., PCB). According to one or more embodiments, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to one or more embodiments, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to one or more embodiments, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to one or more embodiments, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
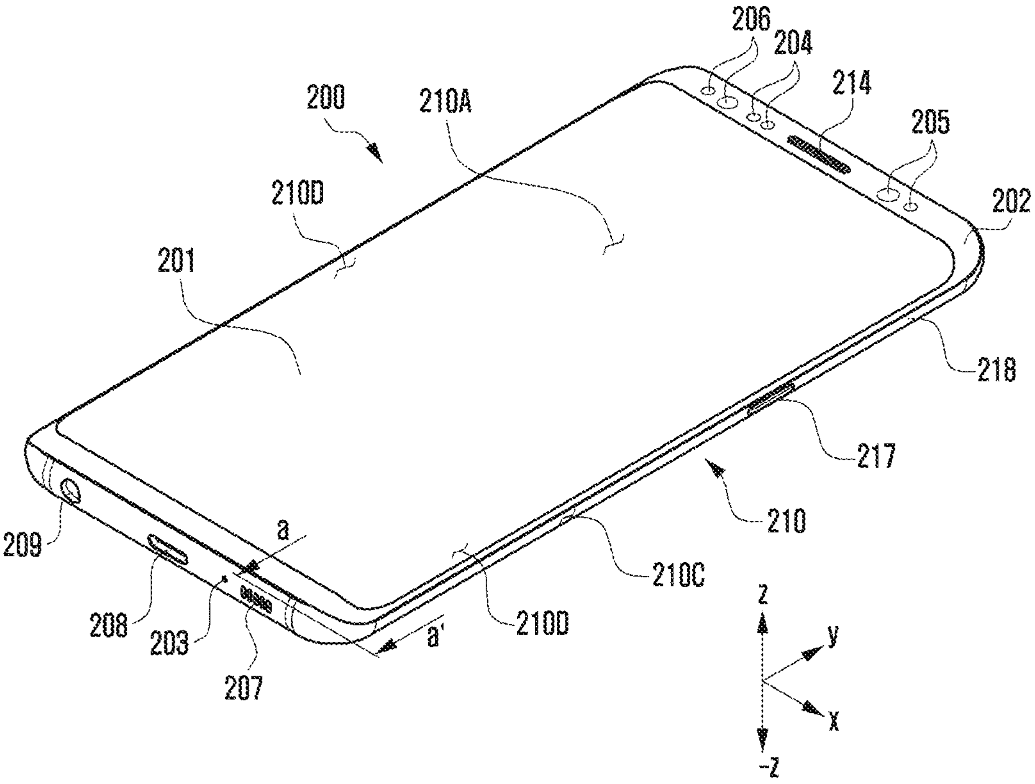
FIG. 2A is a front perspective view of an electronic device according to various embodiments of the disclosure.

FIG. 2A is a front perspective view of an electronic device according to various embodiments of the disclosure.

Figure 2B:
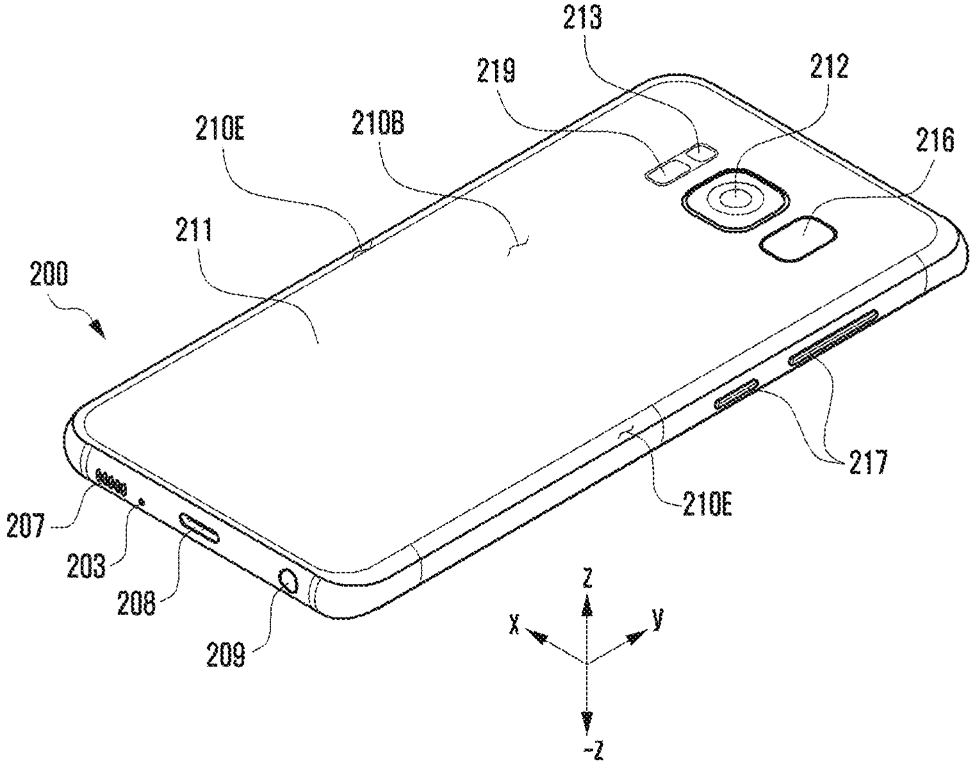
FIG. 2B is a rear perspective view of an electronic device according to various embodiments of the disclosure.

FIG. 2B is a rear perspective view of an electronic device according to various embodiments of the disclosure.

Referring to FIG. 2A and FIG. 2B, an electronic device 200 according to one or more embodiments may include a housing 210 including a first surface 210A (e.g., front surface), a second surface 210B (e.g., rear surface), and a side surface 210C surrounding a space between the first surface 210A and the second surface 210B. According to one or more embodiments, a housing may refer to a structure which forms a part of the first surface 210A, the second surface 210B, and the side surface 210C of FIG. 2A. According to one or more embodiments, the first surface 210A may be configured by a front plate 202, at least a part of which is substantially transparent (e.g., a glass plate including various coating layers or a polymer plate). The second surface 210B may be configured by a rear plate 211 which is substantially opaque. The rear plate 211 may be made of, for example, coated or colored glass, ceramic, polymer, a metal (e.g., aluminum, stainless steel (STS) or magnesium), or a combination of at least two of the above materials. The side surface 210C may be configured by a side bezel structure 218 (e.g., side member) combined with the front plate 202 and the rear plate 211 and including a metal and/or polymer. In some embodiments, the rear plate 211 and the side bezel structure 218 may be integrally configured and may include the same material (e.g., a metal material such as aluminum).

In the illustrated embodiment, the front plate 202 may include two first areas 210D which are disposed at opposite long edges of the front plate 202 and are bent to seamlessly extend from the first surface 210A toward the rear plate 211. In the illustrated embodiment (refer to FIG. 2B), the rear plate 211 may include two second areas 210E which are disposed at opposite long edges and are bent to seamlessly extend from the second surface 210B toward the front plate 202. In some embodiments, the front plate 202 (e.g., the rear plate 211) may include only one of the first areas 210D (or the second areas 210E). According to one or more embodiments, a part of the first areas 210D or the second areas 210E may not be included. In the embodiments, when viewed from a side surface of the electronic device 200, the side bezel structure 218 may have a first thickness (e.g., width) at a side surface in which the first areas 210D or the second areas 210E are not included and may have a second thickness thinner than the first thickness at a side surface including the first areas 210D or the second areas 210E.

According to one or more embodiments, the electronic device 200 may include at least one of a display 201, audio modules 203, 207, and 214, sensor modules 204, 216, and 219, camera modules 205, 212, and 213, a key input device 217, a light-emitting element 206, and connector holes 208 and 209. In some embodiments, the electronic device 200 may omit at least one of elements (e.g., key input device 217 or light-emitting element 206) or additionally include another element.

The display 201 may be, for example, visually exposed through a substantial portion of the front plate 202. In some embodiments, at least a part of the display 201 may be visually exposed through the front plate 202 which forms the first surface 210A and the first areas 210D of the side surface 210C. In some embodiments, a corner of the display 201 may be configured to be generally identical to an outside shape adjacent to the front plate 202. According to one or more embodiments, in order to extend an area where the display 201 is exposed, the display 201 may be configured to have an outer periphery spaced a substantially uniform interval from the outer periphery of the front plate 202.

According to one or more embodiments, a recess or an opening may be configured in a part of a screen display area of the display 201, and at least one of the audio module 214, the sensor module 204, the camera module 205, and the light-emitting element 206 arranged in the recess or the opening may be included. According to one or more embodiments, at least one of the audio module 214, the sensor module 204, the camera module 205, a fingerprint sensor 216, and the light-emitting element 206 may be included in the rear surface of a screen display area of the display 201. According to one or more embodiments, the display 201 may be coupled to or disposed adjacent to a touch sensing circuit, a pressure sensor capable of measuring the intensity (pressure) of a touch, and/or a digitizer configured to detect a magnetic field-type stylus pen. In some embodiments, at least a part of the sensor module 204 and 219 and/or at least a part of the key input device 217 may be disposed on the first areas 210D and/or the second areas 210E.

In one or more examples, the audio modules 203, 207, and 214 may include a microphone hole 203 and speaker holes 207 and 214. The microphone hole 203 may have a microphone disposed inside thereof for obtaining external sound and, in some embodiments, may have a plurality of microphones arranged to sense a direction of sound. The speaker holes 207 and 214 may include an external speaker hole 207 and a call receiver hole 214. In some embodiments, the speaker holes 207 and 214 and the microphone hole 203 may be implemented as a single hole, or a speaker (e.g., a piezo speaker) may be included without the speaker holes 207 and 214.

In one or more examples, the sensor modules 204, 216, and 219 may generate an electrical signal or a data value corresponding to an internal operation state of the electronic device 200 or an external environment state. The sensor modules 204, 216, and 219 may include, for example, the first sensor module 204 (e.g., a proximity sensor) disposed on the first surface 210A of the housing 210 and/or a second sensor module (e.g., a fingerprint sensor) and/or a third sensor module 219 disposed on the second surface 210B of the housing 210 (e.g., an HRM sensor), and/or a fourth sensor module 216 (e.g., a fingerprint sensor). The fingerprint sensor may be disposed on the second surface 210B as well as the first surface 210A (e.g., display 201) of the housing 210. The electronic device 200 may further include a sensor module, for example, at least one of a gesture sensor, a gyro sensor, a barometric pressure sensor, a magnetic sensor, an acceleration sensor, a grip sensor, a color sensor, an infrared (IR) sensor, a biosensor, a temperature sensor, or a humidity sensor, or the illumination sensor 204.

In one or more examples, the camera modules 205, 212, and 213 may include a first camera device 205 disposed on the first surface 210A of the electronic device 200, and a second camera device 212 and/or a flash 213 disposed on the second surface 210B. The camera devices 205 and 212 may include one or more lenses, an image sensor, and/or an image signal processor. The flash 213 may include, for example, a light-emitting diode or a xenon lamp. In some embodiments, two or more lenses (e.g., an infrared camera, and a wide-angle and telephoto lens) and image sensors may be disposed on one surface of the electronic device 200.

The key input device 217 may be disposed on the side surface 210C of the hosing 210. According to one or more embodiments, the electronic device 200 may not include some or all of the key input device 217 described above, and the key input devices 217 not included therein may be implemented in a different form, such as a soft key, on the display 201. In some embodiments, a key input device may include the sensor module 216 disposed on the second surface 210B of the housing 210. In one or more examples, the key input device 217 may be a power button or one or more volume adjustment buttons.

The light-emitting element 206 may be disposed, for example, on the first surface 210A of the housing 210. The light-emitting element 206 may provide, for example, state information of the electronic device 200 in an optical type. According to one or more embodiments, the light-emitting element 206 may provide, for example, a light source interconnected with an operation of the camera module 205. The light-emitting element 206 may include, for example, an LED, an IR LED, and a xenon lamp.

The connector holes 208 and 209 may include a first connector hole 208 capable of receiving a connector (e.g., USB connector) for transmitting or receiving power and/or data to or from an external electronic device, and/or a second connector hole 209 (e.g., earphone jack) capable of receiving a connector for transmitting or receiving an audio signal to or from an external electronic device.

Figure 3:
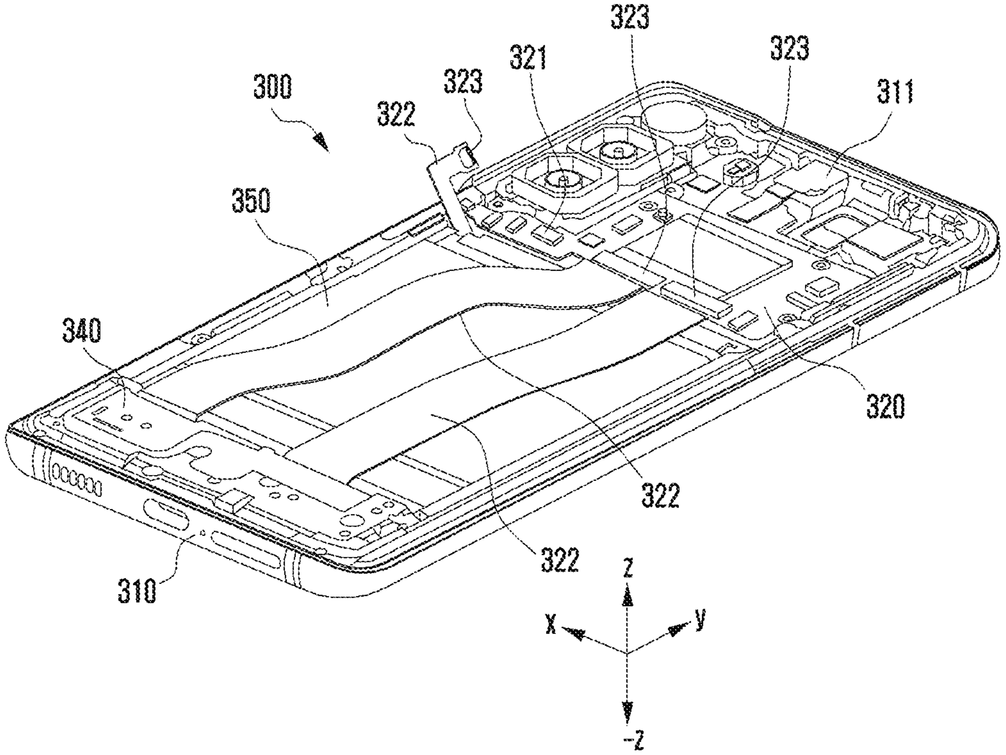
FIG. 3 is a perspective view showing the inside of an electronic device according to various embodiments of the disclosure.

FIG. 3 is a perspective view showing the inside of an electronic device according to various embodiments of the disclosure.

Referring to FIG. 3, an electronic device 300 may include a side bezel structure 310 (e.g., housing), a support member 311 (e.g., bracket), a first printed circuit board 320, a second printed circuit board 340, and a battery 350. In some embodiments, as understood by one of ordinary skill in the art, the electronic device 300 may omit at least one of elements or may additionally include another element. At least one of the elements of the electronic device 300 may be the same as or similar to at least one of the elements of the electronic device 200 of FIG. 2A or FIG. 2B, and redundant descriptions are omitted below.

In one or more examples, a first support member 311 may be disposed inside the electronic device 300 to be connected to the side bezel structure 310 (e.g., housing) or to be integrally configured with the side bezel structure 310. The first support member 311 may be made of, for example, a metal material, and/or a non-metal material (e.g., polymer). The first support member 311 may have one surface to which a display may be coupled and the other surface to which the first and the second printed circuit board 320 and 340 may be coupled. The first printed circuit board 320 may be equipped with a processor, a memory, a sensor, a camera, and/or a female connector 321. The processor may include, for example, one or more of a central processing unit, an application processor, a graphics processing unit, an image signal processor, a sensor hub processor, or a communication processor. In some embodiments, the first printed circuit board 320 may be a stacked substrate on which a plurality of PCBs are stacked.

In one or more examples, the female connector 321 may be a member coupled to a male connector 323 disposed at the end of a cable 322 to electrically connect an electrical element of the electronic device and the cable 322. The term male may be used for indication of a connector disposed at the end of a cable, and the term female may be used for indication of a connector disposed at an object to which the cable is electrically connected. A female connector and a male connector may be coupled by a snap fit coupling using an elastic lug or forcible fitting by a frictional force. In some embodiments, a female connector may have a receiving part in which a conductive contact part is disposed and a male connector may have a terminal which is received in the female connector to form an electric contact at the conductive contact part. However, the disclosure is not limited thereto, and the configuration opposite to the configuration described above is possible.

In one or more examples, the cable 322 may be a member for mutually connecting various electrical elements of an electronic device, for example, elements such as the first and the second printed circuit board 320 and 340, an antenna, a camera and/or a display panel (e.g., the display 201 of FIG. 2A). In some embodiments, the cable 322 may include a ribbon cable, a coaxial cable, a flexible flat cable (FFC) or a flexible printed cable (FPC). A male connector may be disposed at the end of the cable.

In one or more examples, the second printed circuit board 340 may include other electrical elements of an electronic device, for example, a power management semiconductor (power management IC (PMIC)) external interface, for example, an interface for transmitting or receiving power and/or data to or from an external electronic device (e.g., USB interface) and/or an interface for transmitting or receiving an analog audio signal to or from an external electronic device (e.g., 3.5 mm earphone jack). The second printed circuit board may include the cable 322 to be connected to the first printed circuit board.

In one or more examples, the battery 350, which is a device for supplying power to at least one element of the electronic device 300, may include, for example, a non-rechargeable primary battery or a rechargeable secondary battery, or a fuel cell. At least a part of the battery 350 may be disposed, for example, on substantially the same plane as the first and the second printed circuit board 320 and 340. The battery 350 may be integrally disposed inside the electronic device 300 and disposed to be attachable to or detachable from the electronic device 300.

The electronic device 300 according to various embodiments may include an electronic device such as a bar type, a foldable type, a rollable type, a sliding type, a wearable type, a tablet PC, and/or a notebook PC. The electronic device 300 according to various embodiments of the disclosure is not limited to the examples, and may include other various electronic devices known to one of ordinary skill in the art.

Figure 4A:
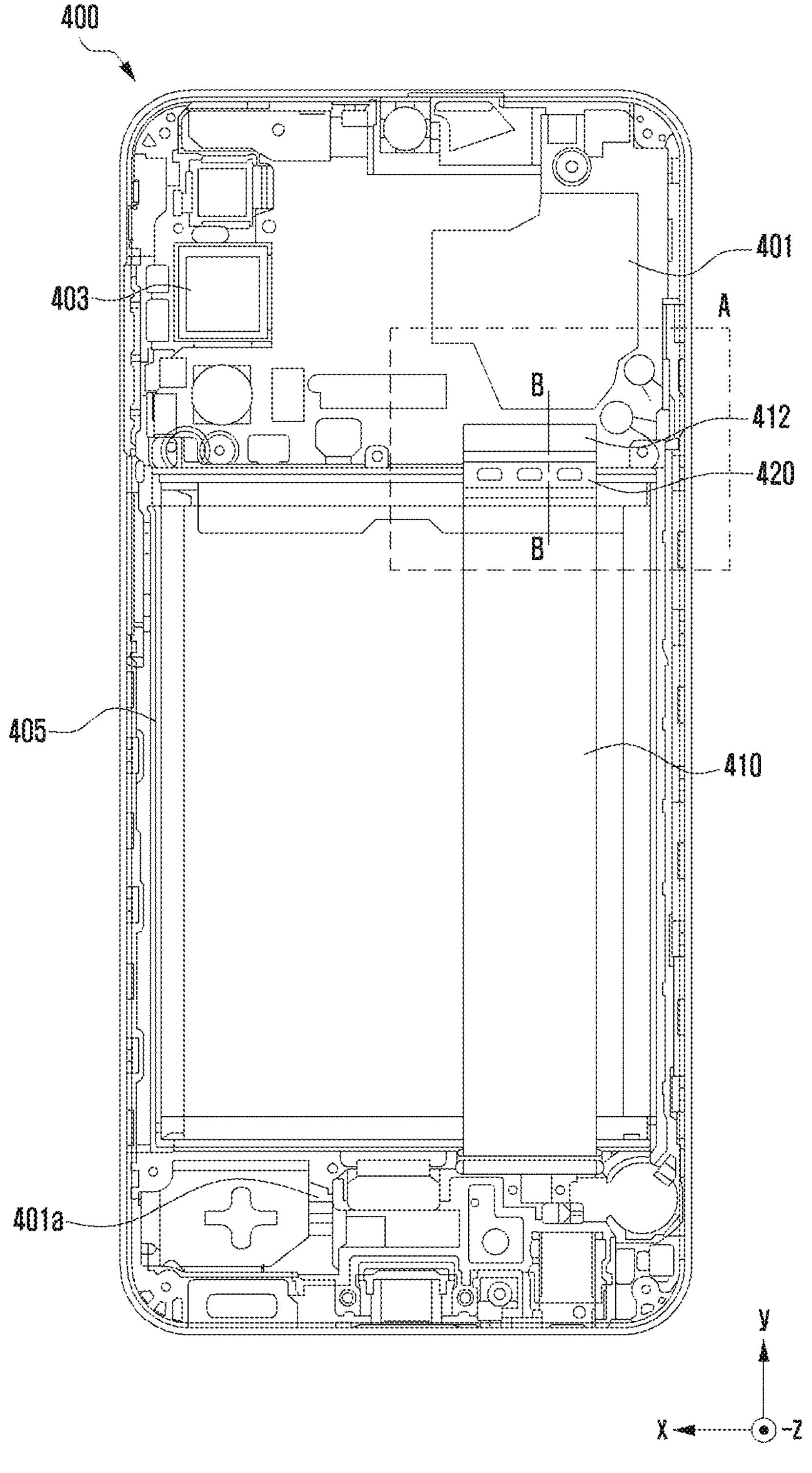
FIG. 4A is a plan view illustrating the inside of an electronic device according to various embodiments of the disclosure.

FIG. 4A is a plan view illustrating the inside of an electronic device 400 according to various embodiments of the disclosure.

Figure 4B:
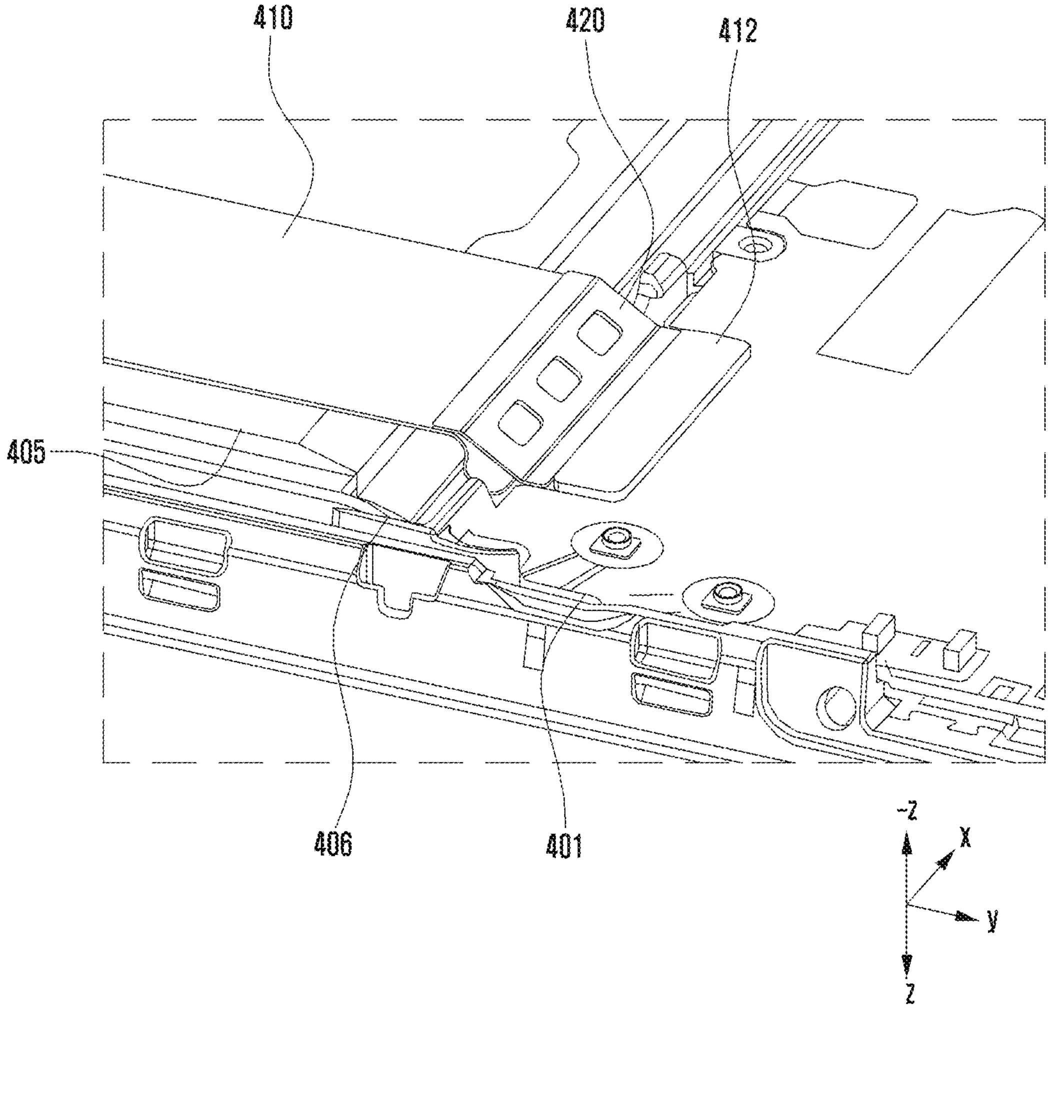
FIG. 4B is an enlarged perspective view illustrating the inside of an electronic device according to various embodiments of the disclosure.

FIG. 4B is an enlarged perspective view illustrating the inside of the electronic device 400 according to various embodiments of the disclosure.

Figure 4C:
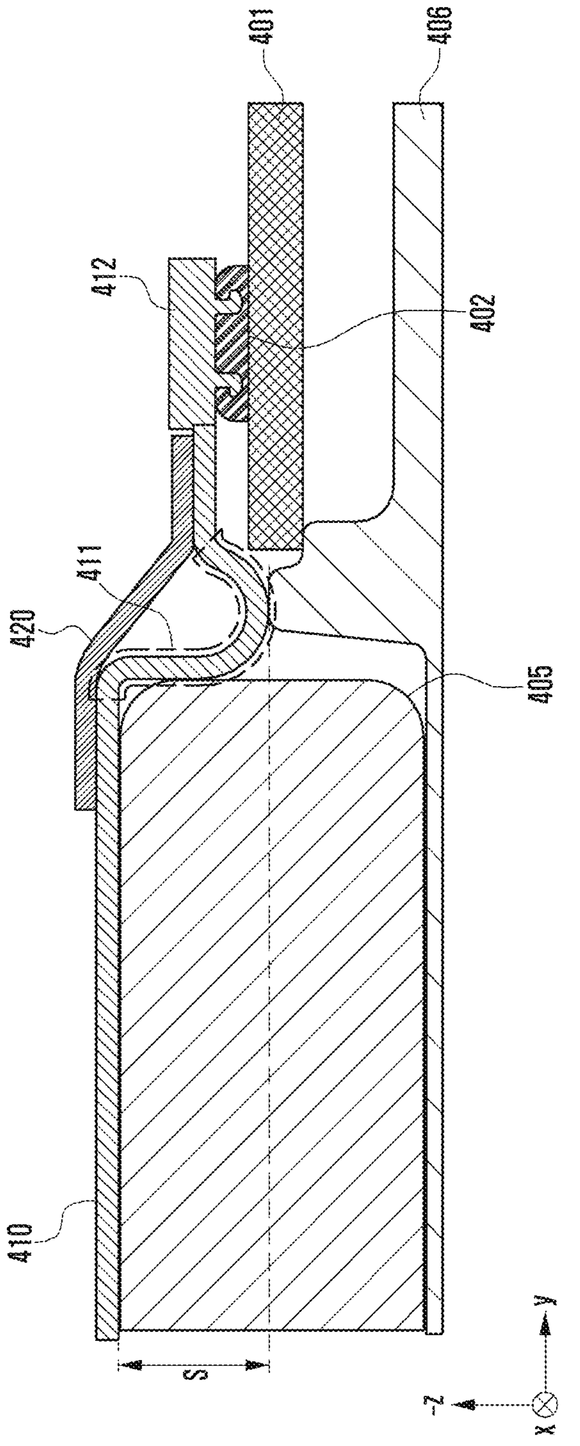
FIG. 4C is a cross-sectional view illustrating the inside of an electronic device according to various embodiments of the disclosure.

FIG. 4C is a cross-sectional view illustrating the inside of the electronic device 400 according to various embodiments of the disclosure.

Figure 4D:
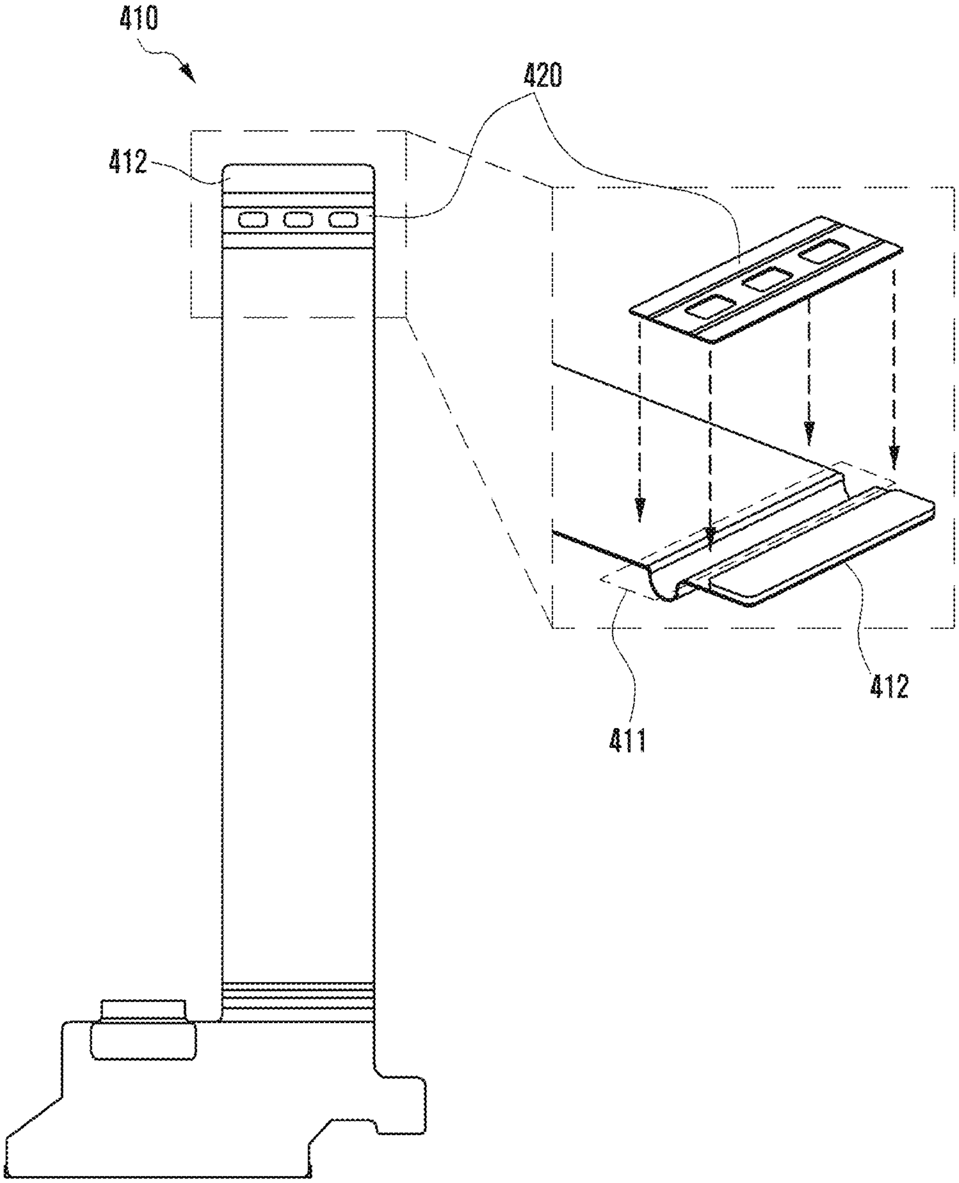
FIG. 4D is a plan view and an enlarged perspective view illustrating a flat cable of the disclosure.

FIG. 4D is a plan view and an enlarged perspective view illustrating a flat cable 410 of the disclosure.

Figure 4E:
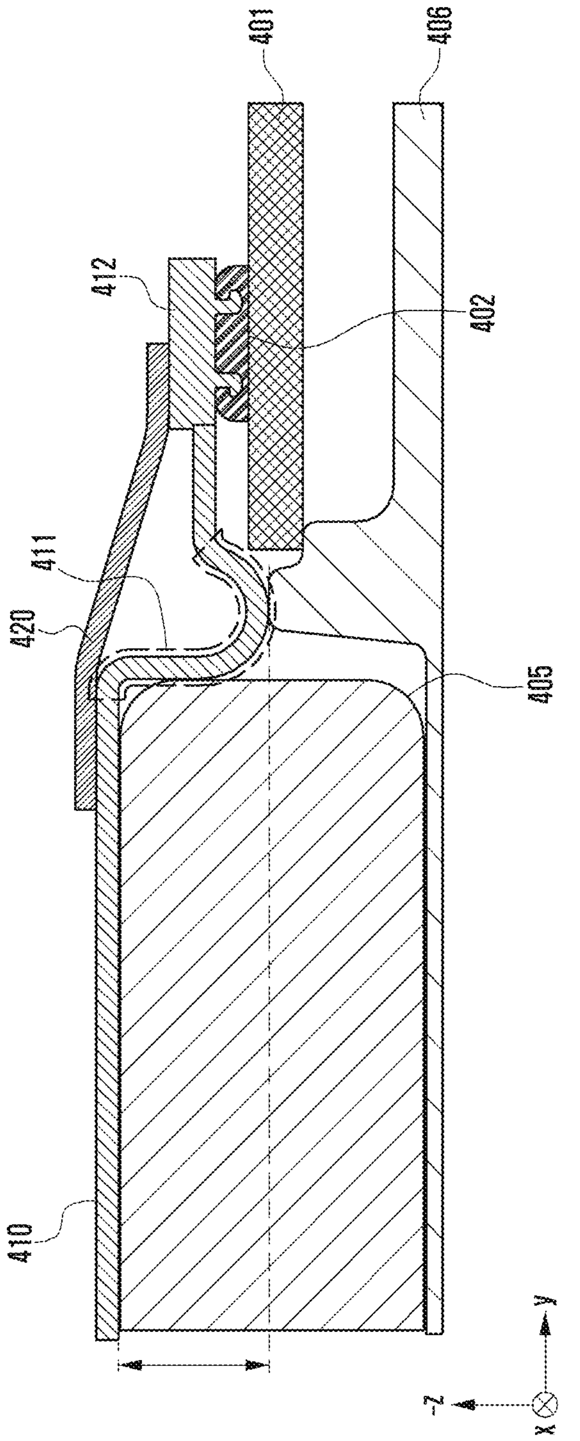
FIG. 4E is a cross-sectional view illustrating the inside of an electronic device according to various embodiments of the disclosure.

FIG. 4E is a cross-sectional view illustrating the inside of the electronic device 400 according to various embodiments of the disclosure.

FIG. 4B is an enlarged view with respect to an area A of FIG. 4A, and FIG. 4C is a cross-sectional view of FIG. 4A taken along the B-B direction.

Referring to FIG. 4A to FIG. 4C, the electronic device 400 (e.g., the electronic device 101 of FIG. 1, the electronic device 200 of FIG. 2A and FIG. 2B, and the electronic device 300 of FIG. 3) may include a printed circuit board 401 (e.g., the first printed circuit board 320 of FIG. 3) and a flat cable 410. The printed circuit board 401 may be a member in which an electrical element, such as a processor (e.g., the processor 120 of FIG. 1), and a memory (e.g., the memory 130 of FIG. 1), of the electronic device 400 is disposed to be electrically connected to each other.

In one or more examples, the flat cable 410 may be an element for electrically connecting a display (e.g., the display 201 of FIG. 2A), a camera module 403 (e.g., the camera modules 205, 212, and 213 of FIG. 2A and FIG. 2B), and/or an auxiliary circuit board 401A (e.g., the second printed circuit board 340 of FIG. 3) of the electronic device 400 with the printed circuit board 401. In various embodiments, the flat cable 410 may include, for example, a ribbon cable, a flexible flat cable 410 (FFC), a flexible printed cable (FPC), and/or a flexible printed circuit board (FPCB).

In various embodiments, the flat cable 410 may include a cable connector 412 disposed at one end of a cable. The cable connector 412 may be a part coupled to an element of the electronic device 400, such as the printed circuit board 401, to form an electrical connection. For example, a female connector 402 may be disposed on the printed circuit board 401, and the cable connector 412 may be coupled to the female connector 402. In various embodiments, the flat cable 410 may extend to one surface of an inner element (e.g., battery 405) of the electronic device 400 spaced apart from the printed circuit board 401 inside the electronic device 400.

Referring to FIG. 4C to 4E, the flat cable 410 according to various embodiments may include a curved part 411 and an elastic bracket 420. The curved part 411 may be a part formed by bending one area of the flat cable 410. For example, one area of the flat cable 410 may be determined to be recessed in a U-shape from one surface of the flat cable 400 to form the curved part 411.

In one or more examples, the elastic bracket 420 may be a member coupled to at least one of opposite ends of the curved part 411 to apply an elastic contraction force. In various embodiments, as illustrated in FIG. 4C, the elastic bracket 420 may be coupled to opposite ends of the curved part 411 and apply an elastic contraction force in a direction in which the opposite ends thereof become closer to each other. The elastic bracket 420 may be a member which includes an elastic material to provide elasticity. The elastic bracket 420 may be, for example, a member having a plate shape or a rod shape made of an elastic material described above. The elastic bracket 420 may be a member coupled to one surface of the flat cable 410 at opposite ends of the curved part 411 to apply a contraction force by elasticity in a direction in which the opposite ends of the curved part 411 become closer to each other. The elastic bracket 420 may be coupled to a surface of the flat cable 410 by various fixing means, such as an adhesive or adhesive tape. For example, as illustrated in FIG. 4C, one end of the elastic bracket 420 is fixed to a first flat surface of the flat cable 410, and an opposite end of the elastic bracket 420 is fixed to a second flat surface of the flat cable 410. The first surface of the flat cable 410 may be on one of the two opposing ends of the curved part 411, and the second surface of the flat cable 410 may be on another of the two opposing ends of the curved part 411. Also, referring to FIG. 4E, the elastic bracket 420 according to various embodiments may be disposed at one end of the curved part 411 (e.g., one end disposed opposite to the cable connector 412 with reference to a curved part) and one surface of the cable connector 412 (e.g., an upper surface of the cable connector 412) For example, the elastic bracket 420 may be coupled to one surface of the cable connector 412 (e.g., an upper surface of the cable connector 412) by a fixing means, such as an adhesive or adhesive tape.

Referring to FIG. 4C again, the electronic device 400, according to various embodiments, may include a step (S) formed therein. The step (S) may be formed by a size difference of elements inside the electronic device 400. For example, the step (S) may be formed by a height (e.g., a size in the −z direction) difference between the battery 405 and a frame 406. In various embodiments, the curved part 411 of the flat cable 410 may be disposed on an area overlapping the step (S). For example, an area of the flat cable 410 overlapping the step (S) may be a groove formed by the step (S) and recessed in a U-shape. The curved part 411 may be disposed in a groove formed by the step (S), so that an inner space of the electronic device 400 can be efficiently used.

Figure 5A:
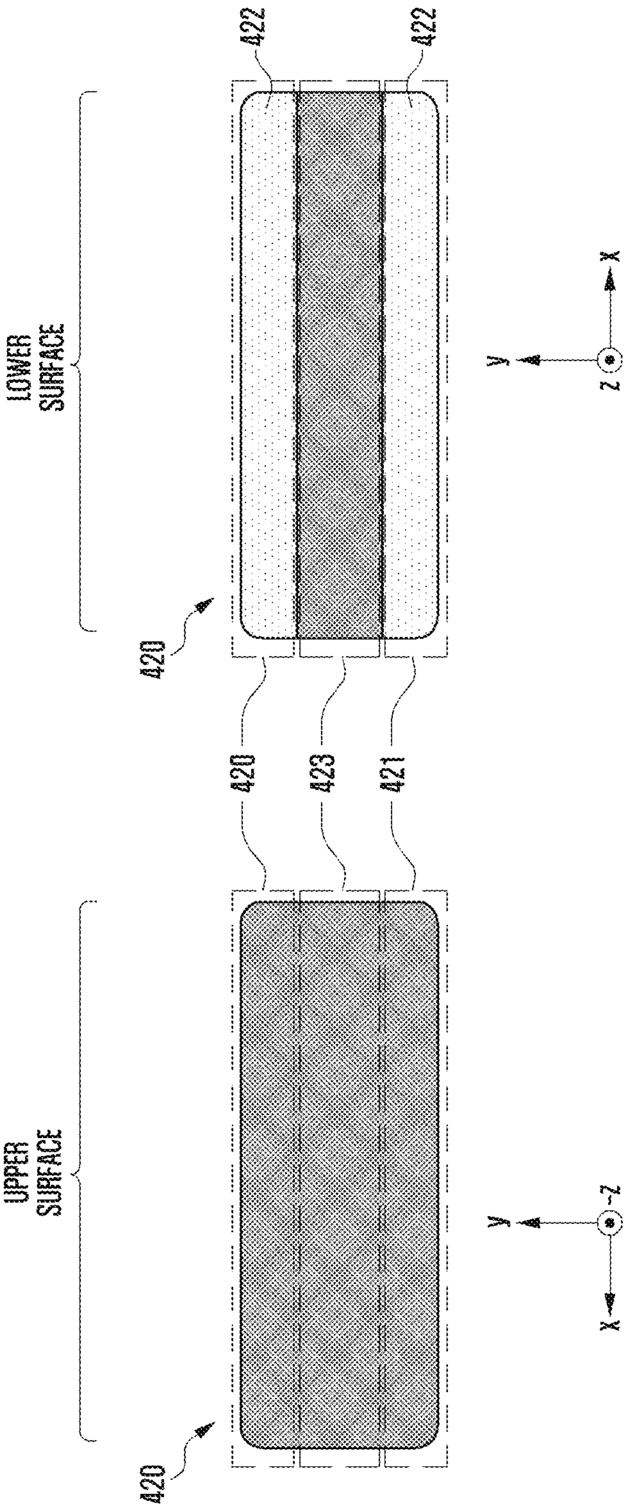
FIG. 5A is an upper and a lower plan view illustrating an elastic bracket according to various embodiments.

FIG. 5A is an upper and a lower plan view illustrating an elastic bracket 420 according to various embodiments.

Figure 5B:
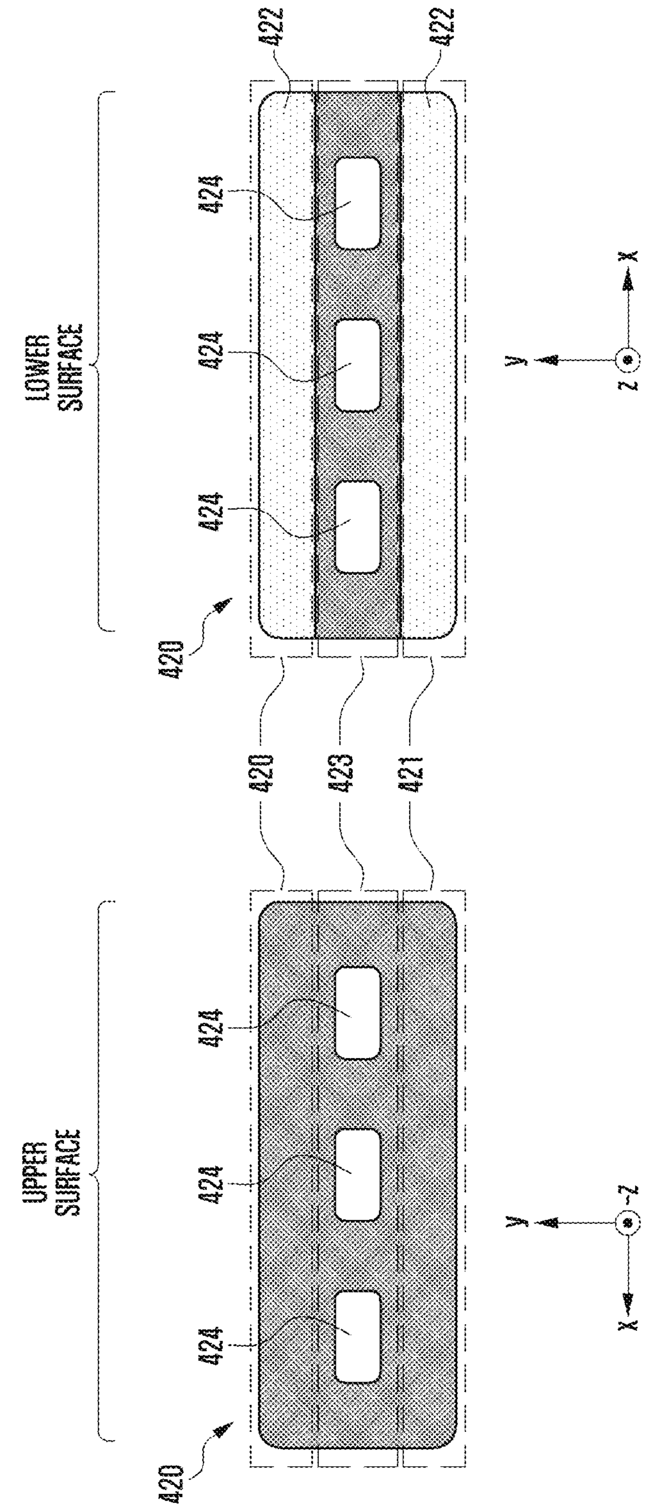
FIG. 5B is an upper and a lower plan view illustrating an elastic bracket according to various embodiments.

FIG. 5B is an upper and a lower plan view illustrating the elastic bracket 420 according to various embodiments.

Figure 5C:
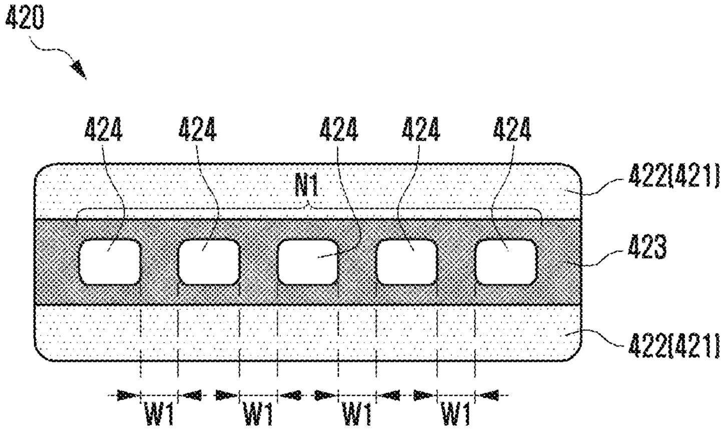
FIG. 5C is an upper and a lower plan view illustrating an elastic bracket according to various embodiments.

FIG. 5C is an upper and a lower plan view illustrating an elastic bracket 420 according to various embodiments.

Referring to FIG. 5A, the elastic bracket 420 may include a flexible part 423 and a fixing part 421. The flexible part 423 may be a part in which a length or width thereof is increased by tension applied to the flat cable 410 and causes a contraction force generated by elasticity. The fixing part 421 may be a part fixed with respect to the flat cable 410 (e.g., at least one of opposite ends of the curved part 411 of the flat cable 410).

In various embodiments, the elastic bracket 420 may include various elastic materials, such as rubber, latex, polyisoprene, NBR, SBR, EPDM, and/or silicone. The elastic bracket 420 may a member in a plate shape or a film shape made of an elastic material. A coupling means to be coupled to the flat cable 410 may be provided on one surface (e.g., lower surface) of the fixing part 421. For example, an adhesive member 422 (e.g., double-sided adhesive tape or applied adhesive) may be disposed on one surface of the fixing part 421.

Referring to FIG. 5B, the flexible part 423 of the elastic bracket 420 may have a reduced cross-section in comparison with that of the fixing part 421. For example, opposite shoulder parts of the flexible part 423 may be recessed, a thickness of the flexible part 423 may decrease in comparison with that of the fixing part 421, or a partial surface of the flexible part 423 may be perforated. In various embodiments, perforated holes 424 may be formed through the flexible part 423. The perforated holes 424 may be a part formed by perforating a part of a surface of the flexible part 423. Corners of the perforated holes 424 may be rounded to prevent the flexible part 423 from a tear due to stress concentration.

Since the flexible part 423 has a reduced cross-section in comparison with that of the fixing part 421, when tension is applied to the flat cable 410 to increase the elastic bracket 420, the amount of deformation may be concentrated on the flexible part 423 and deformation of the fixing part 421 may decrease. When elastic deformation of the fixing part 421 is repeated, there is a risk of reducing adhesive strength of the adhesive member 422 disposed at the fixing part 421. Therefore, the flexible part 423 may have the same cross-section decrease structure as the perforated holes 424, so that adhesive strength reduction of the adhesive member 422 according to extension or contraction of the fixing part 421 may decrease.

Referring to FIG. 5C, the number N1 and a width W1 of the perforated holes 424 formed through flexible part 423 may be configured so that the flexible part 423 has an appropriate elastic contraction force. In one or more examples, an elastic contraction force of the flexible part 423 may be determined by the number N1 and the width W1 of the perforated holes 424. As described below, since an elastic contraction force or rigidity of the flexible part 423 should be maintained within an appropriate range, the number N1 and the width W1 of the perforated holes 424 of the flexible part 423 may be controlled within an appropriate range.

Figure 6A:
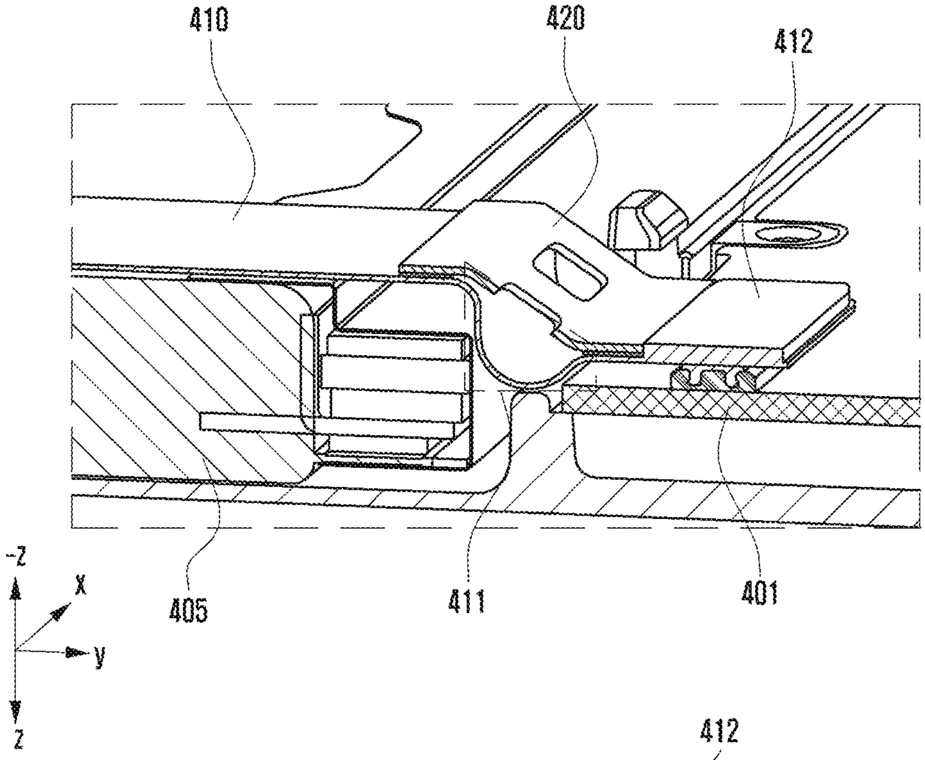
FIG. 6A and FIG. 6B are a cross-sectional perspective view and a plan view illustrating an operation of a flat cable of electronic devices according to various embodiments of the disclosure.
Figure 6A:
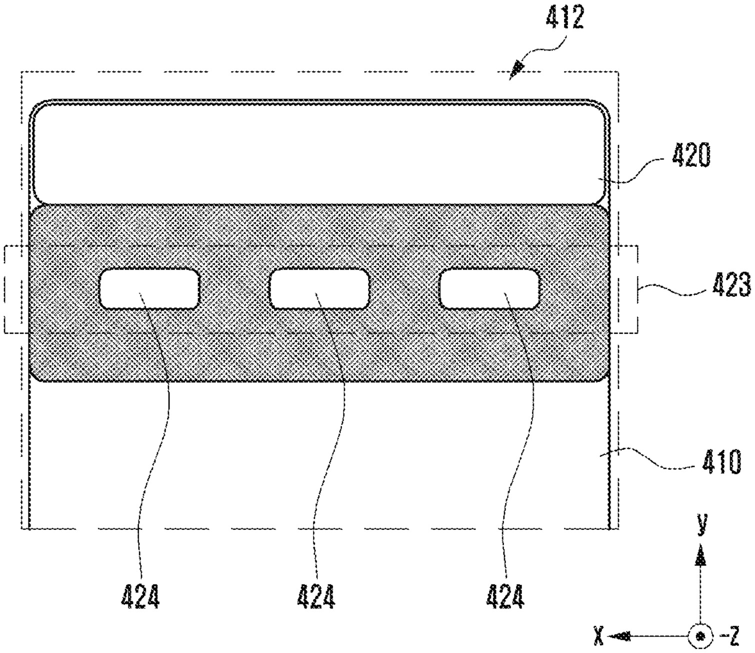
Figure 6B:
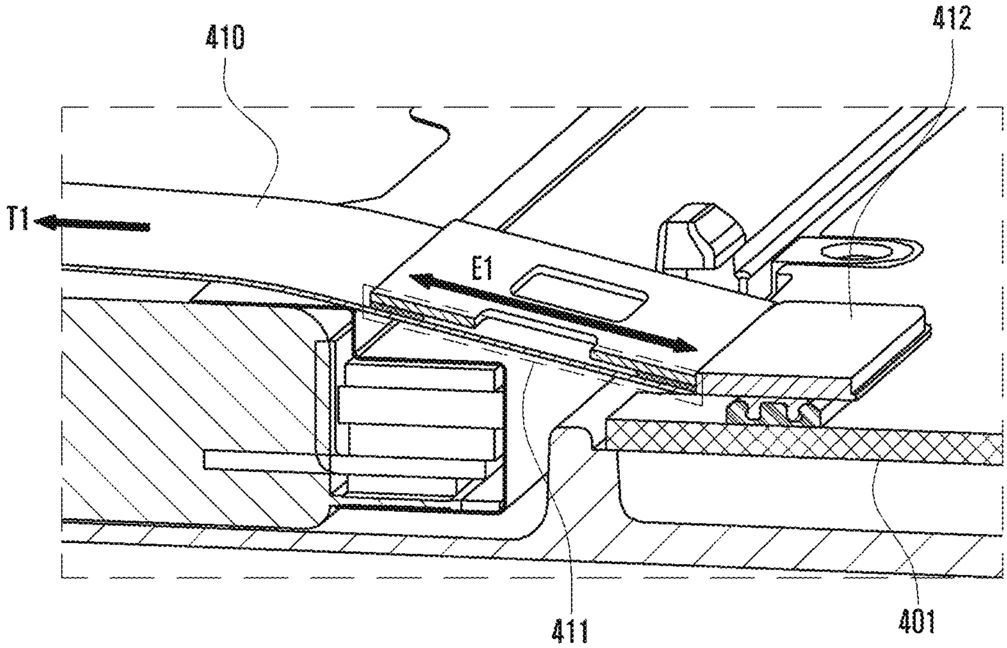
Figure 6B:
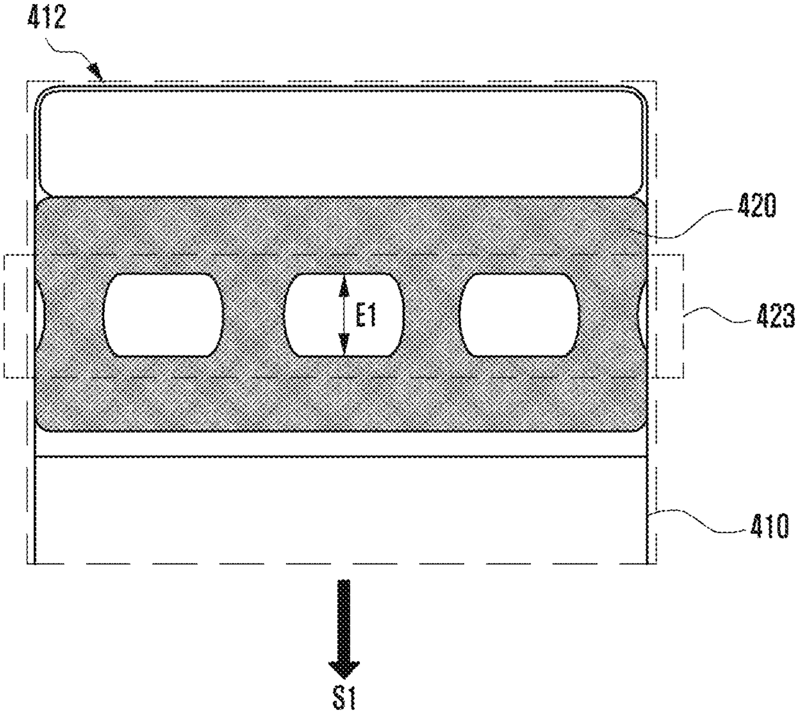

FIG. 6A and FIG. 6B are a cross-sectional perspective view and a plan view illustrating an operation of a flat cable 410 of electronic devices 400 according to various embodiments of the disclosure.

Referring to FIG. 6A and FIG. 6B, the curved part 411 of the flat cable 410 may be at least partially unfolded according to tension applied to the flat cable 410. The elastic bracket 420 may stretch according to unfolding of the curved part 411 by tension, to apply an elastic contraction force in a direction in which opposite ends of the curved part 411 become closer to each other. The flexible part 423 may be stretched along the direction E1 by tension T1 applied to the flat cable. Therefore, the elastic bracket 420 may apply a contraction force to opposite ends of the curved part 411 by elasticity. When the tension T1 is removed, the curved part 411 may be returned to a bent state again by the contraction force applied from the elastic bracket 420.

In one or more examples, when the electronic device 400 is assembled and/or used, the tension T1 may be applied to the flat cable 410. For example, when impact or vibration is applied to the electronic device 400 from the outside, an inner element, such as the battery 405, moves, and then the flat cable 410 extending to a surface of the battery 405 may be pulled. In one or more examples, the source of the tension T1 may be a haptic effect resulting from the use of one or more applications on the electronic device. As the flat cable 410 is pulled above, there is a risk that the cable connector 412 may be separated and/or damaged. According to the disclosure, as one area of the flat cable 410 is bent to form the curved part 411, when tension is applied to the flat cable 410, the curved part 411 may be at least partially unfolded to advantageously reduce a risk that the cable connector 412 is separated or damaged.

In one or more examples, when the curved part 411 is formed on the flat cable 410, since a length of the flat cable 410 increases in comparison with the shortest distance, the flat cable 410 is buckled or raised to press an outside plate of the electronic device 400 (e.g., the rear plate 211 of FIG. 2B) when tension is not applied, so that there is a risk that the outside plate may be raised or separated. Therefore, the elastic bracket 420 may apply an elastic contraction force to opposite ends of the curved part 411 to pull same, so that the buckling of the flat cable 410 may be advantageously reduced or prevented.

In various embodiments, a contraction force of the elastic bracket 420 may be configured to have a value smaller than a threshold value of the tension applied to the flat cable 410, which may cause separation or damage of the cable connector 412. For example, the number N1 of and the width W1 between the perforated holes 424 of the elastic bracket 420 of FIG. 5C may be configured such that the tension of the flexible part 423 has a value as described above. Such a value within the range described above can advantageously reduce the risk that the cable connector 412 may be separated or damaged when being pulled by a contraction force of the elastic bracket 420. In one or more examples, the extension rigidity of the elastic bracket 420 may be configured to have a value higher than that of compression rigidity of the curved part 411 so that the curved part 411 may be returned to an original bent state by tension of the elastic bracket 420.

Figure 7A:
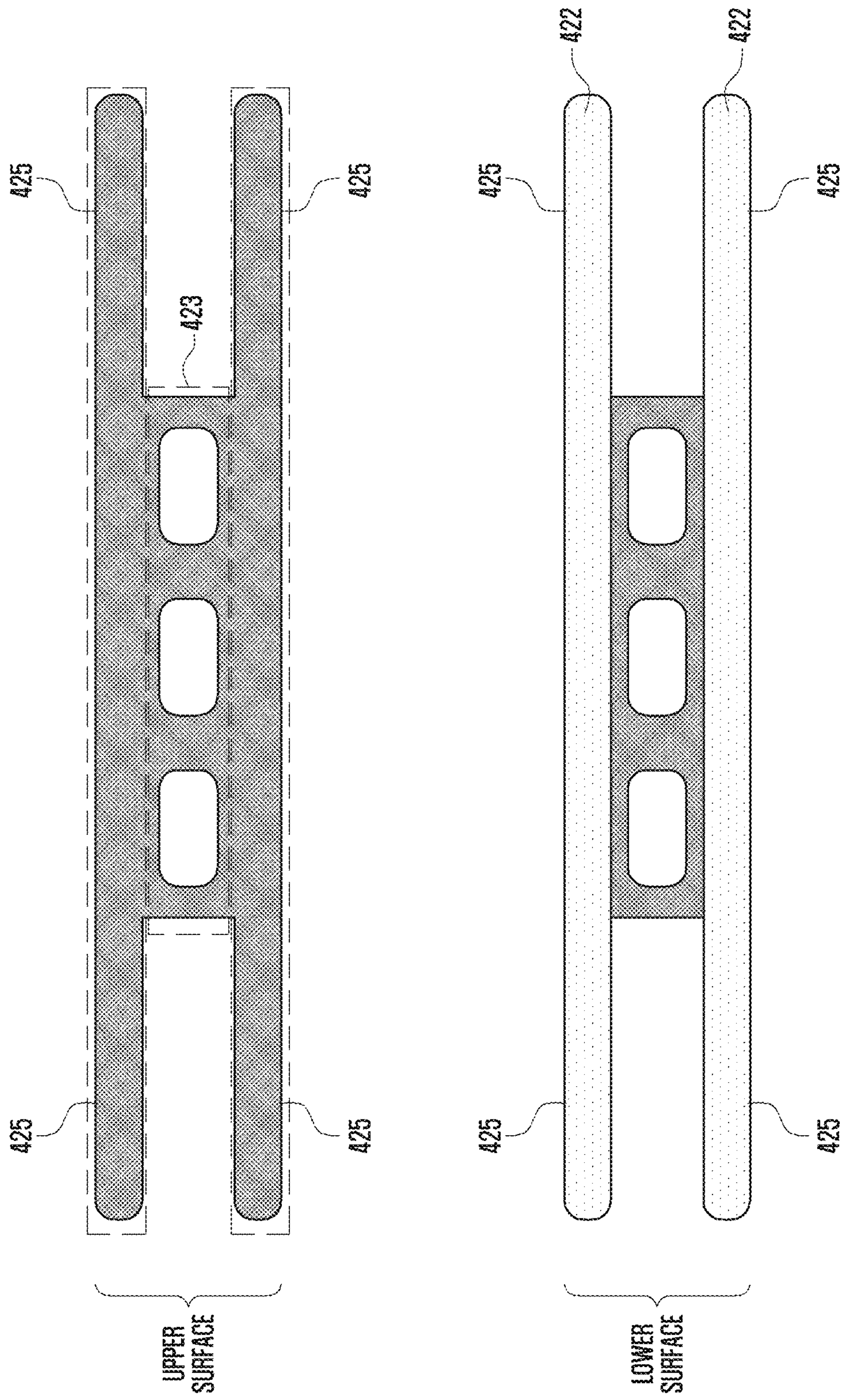
FIG. 7A illustrates an upper and a lower plan view of an elastic bracket according to various embodiments of the disclosure.

FIG. 7A illustrates an upper and a lower plan view of an elastic bracket 420 according to various embodiments of the disclosure.

Figure 7B:
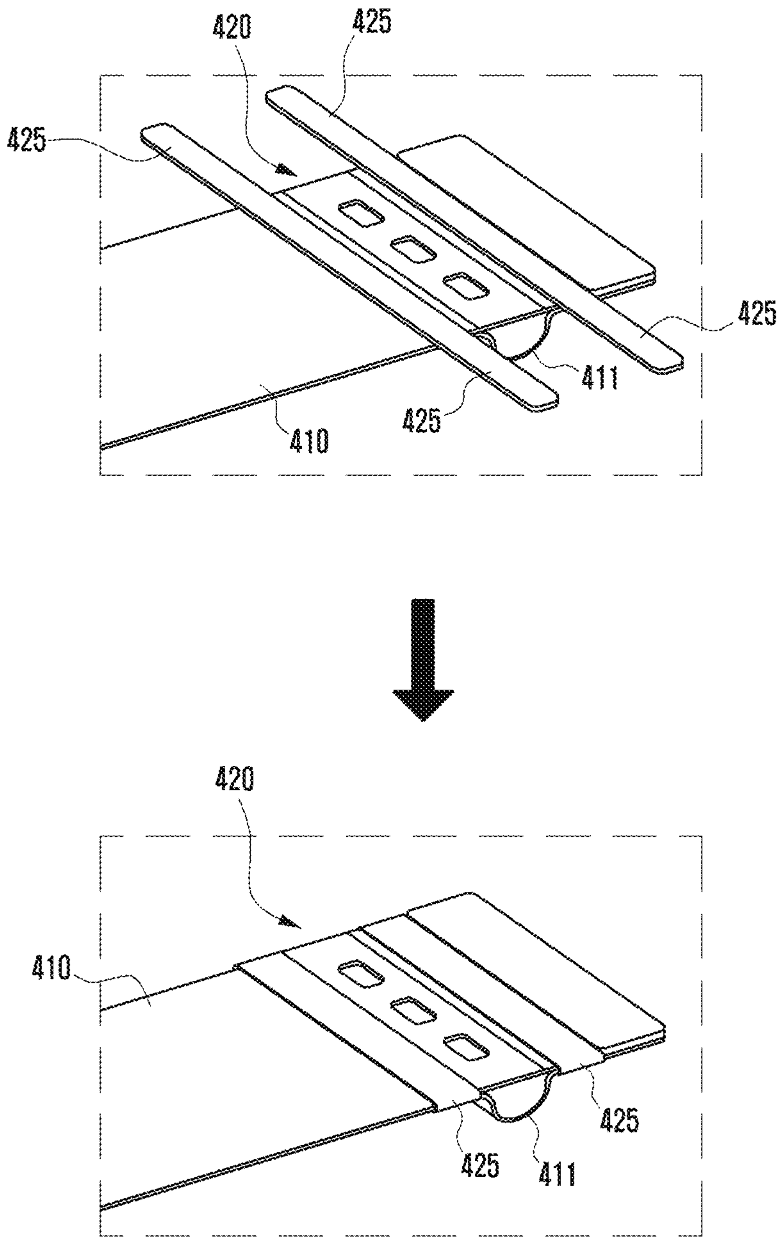
FIG. 7B is a perspective view illustrating an elastic bracket and a flat cable according to various embodiments of the disclosure.

FIG. 7B is a perspective view illustrating the elastic bracket 420 and a flat cable 410 according to various embodiments of the disclosure.

Figure 7C:
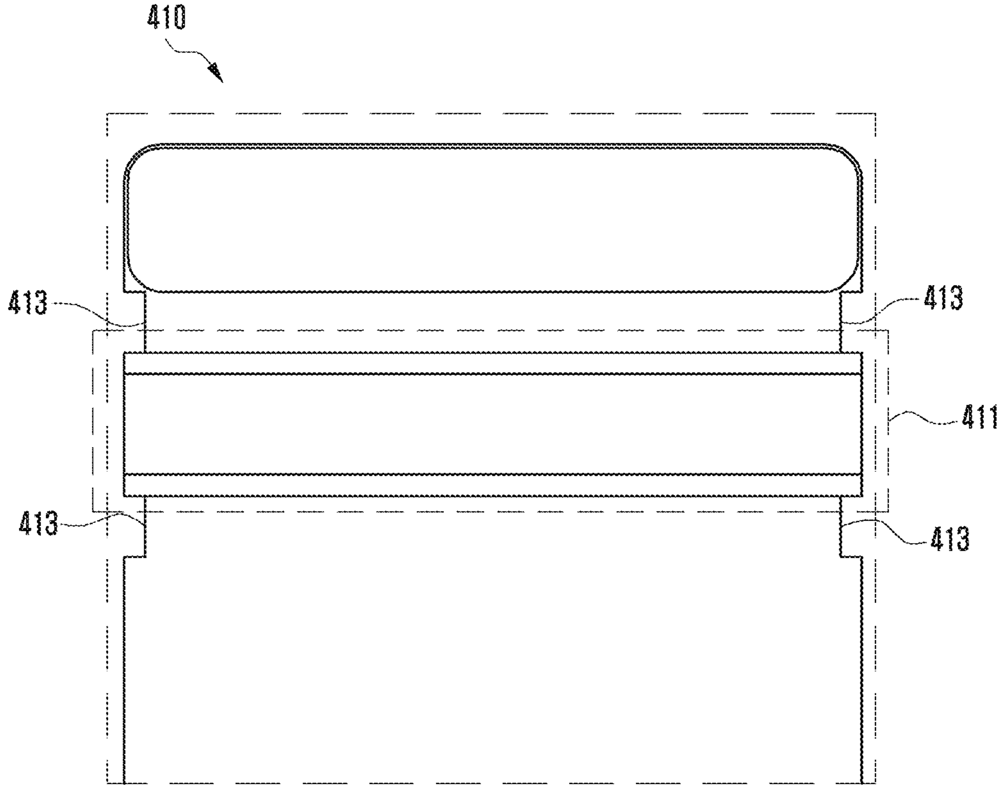
FIG. 7C is a plan view illustrating a flat cable according to various embodiments of the disclosure.

FIG. 7C is a plan view illustrating the flat cable 410 according to various embodiments of the disclosure.

Figure 7D:
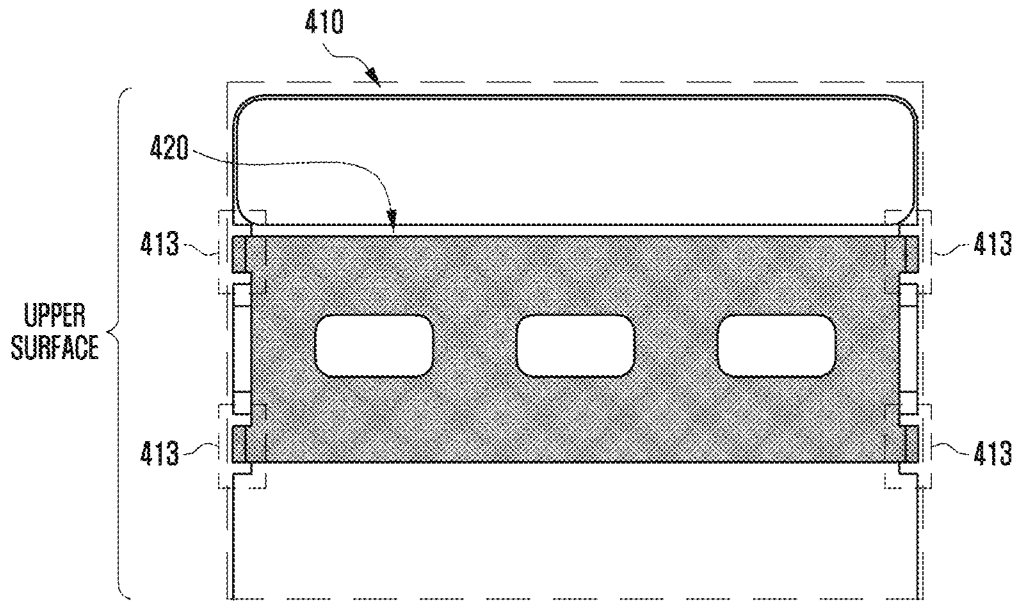
FIG. 7D illustrates an upper and a lower plan view of an elastic bracket and a flat cable according to various embodiments of the disclosure.
Figure 7D:
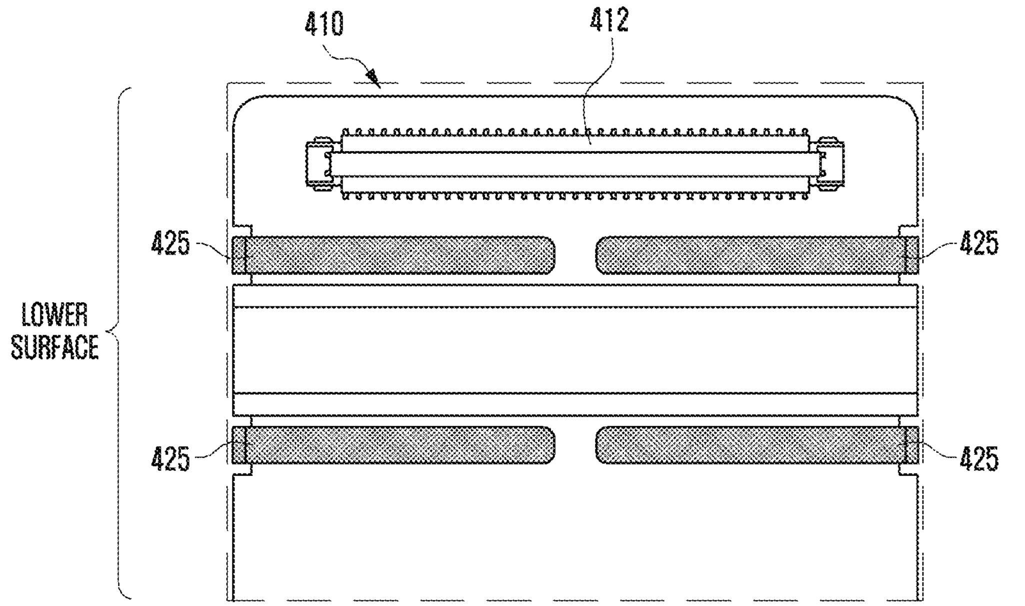

FIG. 7D illustrates an upper and a lower plan view of the elastic bracket 420 and the flat cable 410 according to various embodiments of the disclosure.

Figure 7E:
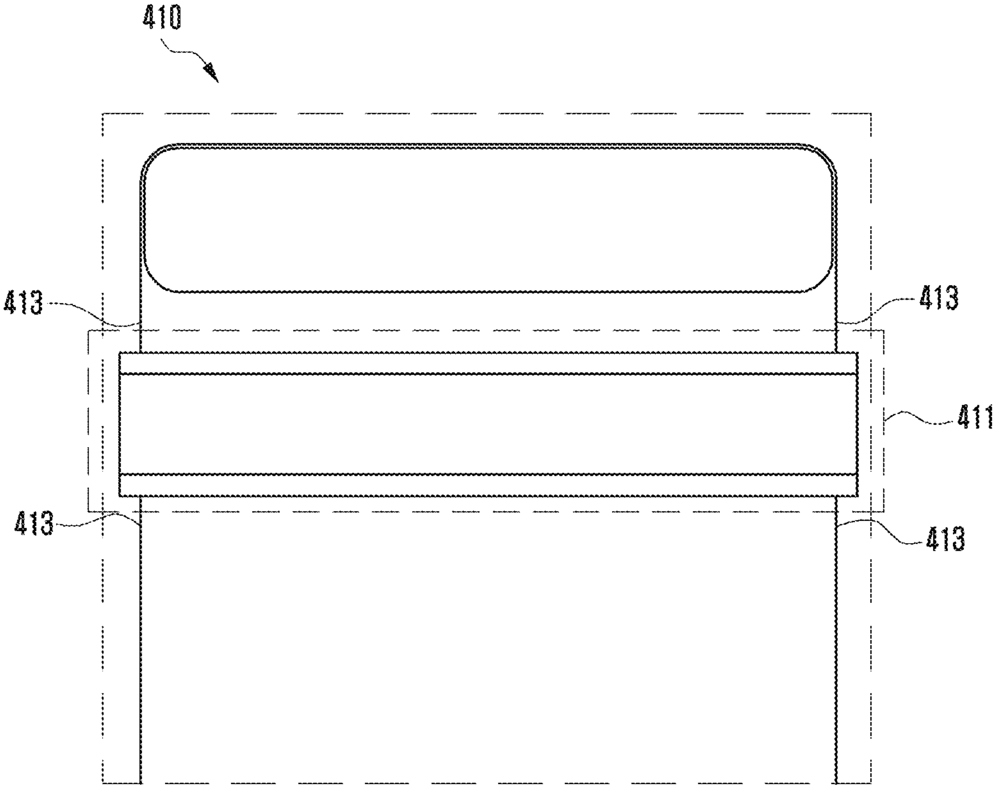
FIG. 7E is a plan view illustrating a flat cable according to various embodiments of the disclosure.

FIG. 7E is a plan view illustrating the flat cable 410 according to various embodiments of the disclosure.

Figure 7F:
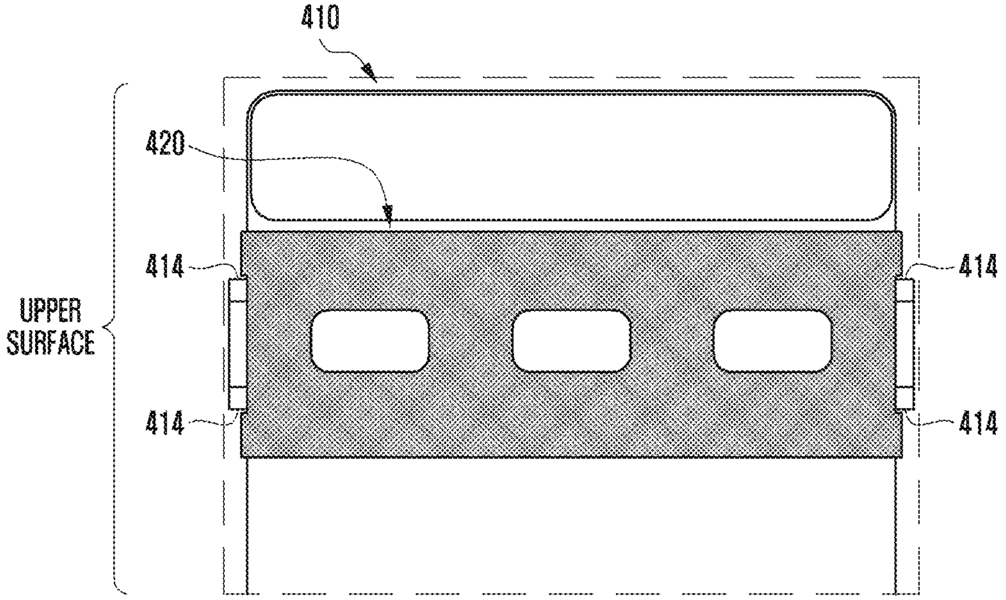
FIG. 7F illustrates an upper and a lower plan view of an elastic bracket and a flat cable according to various embodiments of the disclosure.
Figure 7F:
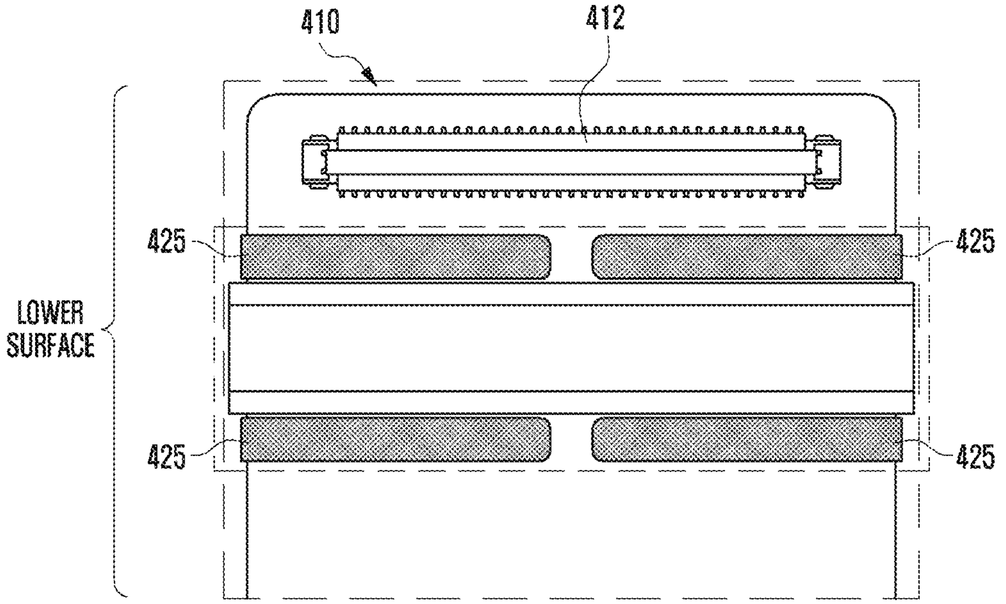

FIG. 7F illustrates an upper and a lower plan view of the elastic bracket 420 and the flat cable 410 according to various embodiments of the disclosure.

Referring to FIGS. 7A and 7B, the fixing part 421 of the elastic bracket 420 may include a lateral extension part 425 extending in a width direction (e.g., the x direction and the −x direction of drawings). A fixing means for fixing the lateral extension part 425 to the flat cable 410 may be disposed on one side of the lateral extension part 425. For example, the adhesive member 422 may extend to the lateral extension part 425.

In one or more examples, the lateral extension part 425 of the elastic bracket 420 may at least partially surround the flat cable 410. For example, the lateral extension part 425 may be folded to at least partially surround a circumference of the flat cable 410. The elastic bracket 420 may surround and be attached to a circumference of the flat cable 410, so that a fixing force with respect to the flat cable 410 of the elastic bracket 420 may be improved, in comparison with one or more embodiments in which the elastic bracket 420 is attached to one surface of the flat cable 410.

Referring to FIGS. 7C and 7D, the flat cable 410 may include a fixing groove 413 formed by reducing a width of an area corresponding to the fixing part 421 (e.g., opposite ends of the curved part 411 to which the fixing part 421 is attached). For example, the fixing groove 413 may be formed by cutting opposite shoulder parts of the flat cable 410.

In various embodiments, the lateral extension part 425 may be folded to be put over the fixing groove 413. For example, the lateral extension part 425 may extend through the fixing groove 413 from the first surface (e.g., upper surface) of the flat cable 410 to the second surface of the flat cable 410 and be attached to the flat cable 410. The flat cable 410 may include the fixing groove 413 and the lateral extension part 425 of the elastic bracket 420 may be caught in the fixing groove 413, so that the elastic bracket 420 and the flat cable 410 may be firmly fixed.

Referring to FIGS. 7E and 7F, the flat cable 410 may include a fixing protrusion 414 formed by increasing a width of a partial area (e.g., opposite ends of the curved part 411 to which the fixing part 421 is attached) of the flat cable 410 so that the fixing part 421 is caught therein.

In various embodiments, the lateral extension part 425 may be folded to be caught in the fixing protrusion 414. For example, the lateral extension part 425 may extend through one side of the fixing protrusion 414 from the first surface (e.g., upper surface) of the flat cable 410 to the second surface of the flat cable 410 and be attached to the flat cable 410. The flat cable 410 may include the fixing protrusion 414 and the lateral extension part 425 of the elastic bracket 420 may be caught in the fixing protrusion 414, so that the elastic bracket 420 and the flat cable 410 may be firmly fixed.

An electronic device 400 according to various embodiments of the disclosure may include a printed circuit board 401 and a flat cable 410, one end of which is electrically connected to the printed circuit board 401. The flat cable 410 may include a cable connector 412 disposed at the one end and coupled to the printed circuit board 401, a curved part 411 formed by bending one area of the flat cable 410, and an elastic bracket 420 having an elastic material and coupled to at least one of opposite ends of the curved part 411, to apply an elastic contraction force in a direction in which the opposite ends become closer to each other.

In various embodiments, the electronic device 400 may further include a plurality of elements disposed therein and having different sizes, and a step (S) formed by a size difference of the elements, wherein the curved part 411 is disposed on an area of the flat cable 410 overlapping the step (S). For example, two different elements may have different heights, thereby forming a stepped structure.

In various embodiments, the curved part 411 may have a U-shape.

In various embodiments, the elastic bracket 420 may include a flexible part 423 configured to extend or contract along a direction of tension applied to the flat cable 410, and a fixing part 421 fixed to opposite ends of the curved part 411 of the flat cable 410.

In various embodiments, the at least one fixing part 421 may include an adhesive member 422 provided on one surface to be attached to a surface of the flat cable 410.

In various embodiments, the flexible part 423 may be configured so that a cross sectional area thereof decreases in comparison with that of the at least one fixing part 421, with respect to a direction of tension applied to the flat cable 410.

In various embodiments, the flexible part 423 may include perforated holes 424 formed by perforating a part of a surface of the flexible part 423.

In various embodiments, the elastic contraction force may be determined according to the number of and an arrangement interval between the perforated holes 424.

In various embodiments, the at least one fixing part 421 may include a lateral extension part 425 extending in a width direction of the flat cable 410, and the lateral extension part 425 may be folded to at least partially surround the flat cable 410.

In various embodiments, the flat cable 410 may include a fixing groove 413 formed by reducing a width in an area corresponding to the lateral extension part 425, and the lateral extension part 425 may be folded to be put over the fixing groove 413.

A flat cable 410 according to various embodiments of the disclosure may be the flat cable 410 of an electronic device 400 including a printed circuit board 401 and the flat cable 410, one end of which is electrically connected to the printed circuit board 401, and having a step (S) formed therein. The flat cable 410 may include a cable connector 412 disposed at the one end and coupled to the printed circuit board 401, a curved part 411 formed by bending one area of the flat cable 410, and an elastic bracket 420 having an elastic material and coupled to at least one of opposite ends of the curved part 411, to apply an elastic contraction force in a direction in which the opposite ends become more closer to each other.

In various embodiments, the curved part 411 may be disposed on an area overlapping the step (S) of the electronic device 400.

In various embodiments, the curved part 411 may have a U-shape.

In various embodiments, the elastic bracket 420 may include a flexible part 423 configured to extend or contract along a direction of tension applied to the flat cable 410, and at least one fixing part 421 fixed to at least one of opposite ends of the curved part 411 of the flat cable 410.

In various embodiments, the at least one fixing part 421 may include an adhesive member 422 provided on one surface to be attached to a surface of the flat cable 410.

In various embodiments, the flexible part 423 may be configured so that a cross sectional area thereof decreases in comparison with that of the at least one fixing part 421, with respect to a direction of tension applied to the flat cable 410.

In various embodiments, the flexible part 423 may include perforated holes 424 formed by perforating a part of a surface of the flexible part 423.

In various embodiments, the elastic contraction force may be determined according to the number of and an arrangement interval between the perforated holes 424.

In various embodiments, the at least one fixing part 421 may include a lateral extension part 425 extending in a width direction of the flat cable 410, and the lateral extension part 425 may be folded to at least partially surround the flat cable 410.

In various embodiments, the flat cable 410 may include a fixing groove 413 formed by reducing a width in an area corresponding to the lateral extension part 425, and the lateral extension part 425 may be folded to be put over the fixing groove 413.

Embodiments disclosed in this specification and drawings merely present specific examples in order to easily describe the technical features according to the embodiments disclosed in this document and to help understanding of the embodiments disclosed in this document, and are not intended to limit the scope of the embodiments disclosed in this document. Accordingly, the scope of the various embodiments of the disclosure should be construed in such a manner that, in addition to the embodiments disclosed herein, all changes or modifications derived from the technical idea of the various embodiments of the disclosure are included in the scope of the various embodiments of the disclosure.

The invention claimed is:

1. An electronic device comprising:

a frame;

a battery disposed on the frame;

a printed circuit board; and a flat cable having an end electrically connected to the printed circuit board, at least a portion of the flat cable being disposed on the battery, wherein the flat cable comprises:

a cable connector disposed at the end of the flat cable and coupled to the printed circuit board;

a curved part having a first end and a second end; and an elastic bracket comprising an elastic material, the elastic bracket being coupled to at least one of the first end or the second end of the curved part and configured to apply an elastic contraction force in a direction in which the first and second ends of the curved part become closer to each other, wherein the curved part of the flat cable is disposed in a space formed by the battery, the frame, and the elastic bracket.

2. The electronic device of claim 1, wherein the curved part has a U-shape.

3. The electronic device of claim 1, wherein the elastic bracket comprises:

a flexible part configured to extend or contract along a direction of tension applied to the flat cable; and at least one fixing part fixed to the at least one of the first end or the second end of the curved part of the flat cable.

4. The electronic device of claim 3, wherein the at least one fixing part comprises an adhesive member at a surface of the at least one fixing part and attached to a surface of the flat cable.

5. The electronic device of claim 3, wherein the flexible part is further configured so that a cross sectional area of the flexible part decreases in comparison with a cross sectional area of the at least one fixing part with respect to the direction of tension applied to the flat cable.

6. The electronic device of claim 5, wherein a surface of the flexible part comprises perforated holes formed therein.

7. The electronic device of claim 6, wherein the elastic contraction force is based on to a number of the perforated holes and an arrangement interval between the perforated holes.

8. The electronic device of claim 3, wherein the at least one fixing part comprises a lateral extension part extending in a width direction of the flat cable, and wherein the lateral extension part is folded to at least partially surround the flat cable.

9. The electronic device of claim 8, wherein the flat cable further comprises a fixing groove formed by reducing a width in an area corresponding to the lateral extension part, and wherein the lateral extension part is in the fixing groove.

10. A flat cable of an electronic device comprising a printed circuit board, a frame, and a battery disposed on the frame, the flat cable having one end electrically connected to the printed circuit board, and the flat cable comprising:

a cable connector disposed at one end of the flat cable and coupled to the printed circuit board;

a curved part having a first end and a second end; and an elastic bracket comprising an elastic material, the elastic bracket being coupled to at least one of the first end or the second end of the curved part and configured to apply an elastic contraction force in a direction in which the first and second ends ends of the curved part become closer to each other, wherein the curved part of the flat cable is disposed in a space formed by the battery, the frame, and the elastic bracket.

11. The flat cable of claim 10, wherein the curved part has a U-shape.

12. The flat cable of claim 10, wherein the elastic bracket comprises:

a flexible part configured to extend or contract along a direction of tension applied to the flat cable; and at least one fixing part fixed to the at least one of the first end or the second end of the curved part.

13. The flat cable of claim 12, wherein the at least one fixing part comprises an adhesive member at a surface of the at least one fixing part and attached to a surface of the flat cable.

14. The flat cable of claim 12, wherein the flexible part is further configured so that a cross sectional area of the flexible part decreases in comparison with a cross sectional area of the at least one fixing part with respect to the direction of tension applied to the flat cable.

15. The flat cable of claim 14, wherein a surface of the flexible part comprises perforated holes formed therein.

16. The flat cable of claim 15, wherein the elastic contraction force is determined according to a number of the perforated holes and an arrangement width of the perforated holes.

17. The flat cable of claim 12, wherein the at least one fixing part further comprises a lateral extension part extending in a width direction of the flat cable, and wherein the lateral extension part is configured to at least partially surround the flat cable.

18. The flat cable of claim 17, wherein the flat cable comprises a fixing groove formed by reducing a width in an area corresponding to the lateral extension part, and wherein the lateral extension part is in the fixing groove.

* * * * *